United States Patent [19]

Maidment

[11] Patent Number: 5,697,274

[45] Date of Patent: *Dec. 16, 1997

[54] APPARATUS FOR TRIMMING CAN BODIES

[75] Inventor: Wallace E. Maidment, Chesterfield County, Va.

[73] Assignee: Reynolds Metals Company, Richmond, Va.

[*] Notice: The term of this patent shall not extend beyond the expiration date of Pat. No. 5,694,822.

[21] Appl. No.: 524,074

[22] Filed: Sep. 6, 1995

Related U.S. Application Data

[63] Continuation of Ser. No. 147,278, Oct. 27, 1993, abandoned, which is a continuation-in-part of Ser. No. 107,862, Aug. 16, 1993, abandoned.

[51] Int. Cl.$^6$ ............................................. B23D 21/00
[52] U.S. Cl. ............................ 83/114; 83/54; 83/115; 83/186
[58] Field of Search ........................... 83/54, 114, 137, 83/185, 186, 914, 115, 150; 82/58

[56] References Cited

U.S. PATENT DOCUMENTS

| | | |
|---|---|---|
| 2,298,366 | 10/1942 | Gladfelter et al. |
| 2,526,163 | 10/1950 | Shippy et al. |
| 3,359,841 | 12/1967 | Cvacho et al. |
| 3,364,709 | 1/1968 | Scarm ........................... 72/71 |
| 3,400,620 | 9/1968 | Armbruster et al. ............ 82/47 |
| 3,581,691 | 6/1971 | Ringler ........................... 83/54 X |
| 3,756,103 | 9/1973 | Cvacho et al. .................. 82/101 |
| 3,802,364 | 4/1974 | Paramonoff ..................... 72/361 X |
| 3,864,995 | 2/1975 | Langewis ........................ 82/54 |
| 3,894,455 | 7/1975 | Stroobants ...................... 82/58 |
| 3,972,299 | 8/1976 | Hasselbeck et al. ............ 83/54 X |
| 3,994,251 | 11/1976 | Hake et al. ..................... 82/101 X |
| 4,022,089 | 5/1977 | Bulso, Jr. et al. .............. 83/137 X |
| 4,062,311 | 12/1977 | Zugcic et al. .................. 83/54 X |
| 4,341,103 | 7/1982 | Escallon et al. ................ 72/70 |
| 4,489,584 | 12/1984 | Gall et al. ...................... 72/327 |
| 4,510,830 | 4/1985 | Post ................................ 83/114 |
| 4,843,930 | 7/1989 | Ashbolt ........................... 83/39 |
| 4,914,990 | 4/1990 | Hellweg et al. ................. 82/54 |

FOREIGN PATENT DOCUMENTS

| | | |
|---|---|---|
| 0648566 | 4/1995 | European Pat. Off. |
| 2298395 | 8/1976 | France . |
| 2332844 | 6/1977 | France . |
| 1096316 | 7/1961 | Germany . |
| 2218396 | 10/1973 | Germany . |
| 2401474 | 8/1974 | Germany . |
| 2548472 | 5/1977 | Germany . |
| 1268968 | 3/1972 | United Kingdom . |

*Primary Examiner*—Eugenia Jones
*Attorney, Agent, or Firm*—Robert C. Lyne, Jr.

[57] ABSTRACT

Apparatus for trimming cylindrical cans wherein each can is orbited about a central turret axis while being rotated about its longitudinal can axis is disclosed. The cans are successively mounted with vacuum onto a support mandrel located on a support shaft within each of plural cartridge assemblies mounted at circumferentially spaced intervals on a turret disk. The can is firmly secured to the mandrel by vacuum so that the open end portion of the can body projects between an outside circular cutting knife and an inside trimming edge disposed within the open end. As the cartridge orbits about the turret axis on the shaft axis, the inside trimming edge is radially displaced by camming action into contact with the open end portion of the can body and the outside cutting edge to generate cutting forces for trimming the portion. This trimming occurs as the inside trimming edge is maintained radially closer to the turret axis than the can body and the outside cutting edge which remain centered on the cartridge axis. In the preferred embodiment, however, this trimming can occur by gradually camming the entire circumference extent of the inside trimming edge into contact with the can body without rotating either the trimming edge, outside cutting edge, or can body in relation to the cartridge axis. By locating the can supporting mandrel on the cartridge shaft, set-up of trim height and trim quality is self-contained within the cartridge which allows for set-up and quality verification in the tool room before the cartridge is placed in a production machine.

17 Claims, 10 Drawing Sheets

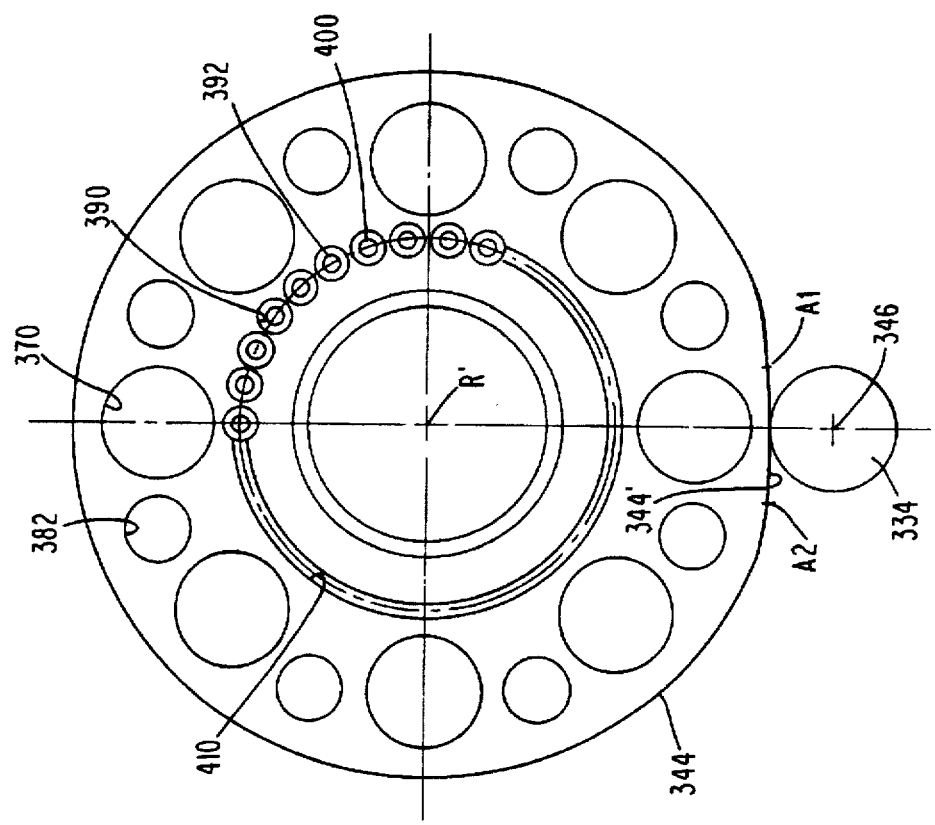
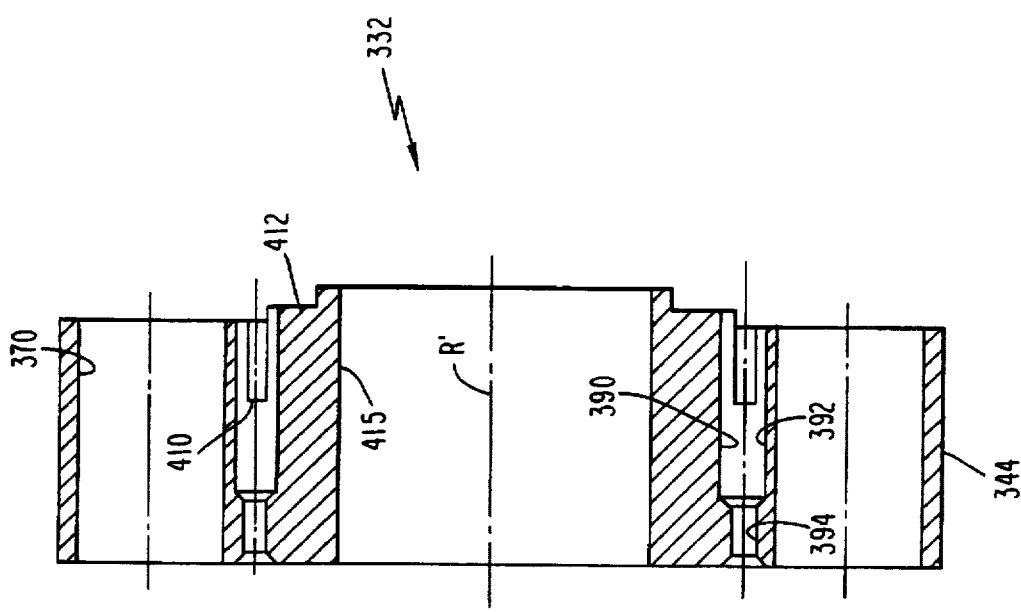
Figure 11
Figure 10

APPARATUS FOR TRIMMING CAN BODIES

This application is a continuation of application Ser. No. 08/147,278, filed Oct. 27, 1993, abandoned, which is a continuation-in-part of application Ser. No. 08/107,862, filed Aug. 16, 1993, abandoned.

TECHNICAL FIELD

The present invention relates generally to trimming an annulus from an open end of a cylindrical side wall of a can body such that the open end terminates in one plane and, more particularly, to the use of inner and outer shearing elements and the manner in which they coact to generate cutting forces for trimming the can.

BACKGROUND ART

In plants for manufacturing one-piece beverage containers, a trimmer immediately follows a draw and iron press used to form the can body. The purpose of the trimmer is to cut off a small portion or annulus (e.g., ¼ inch in axial dimension) of the open end of the can body so as to provide a side wall having a uniform height and a smooth, uniform edge residing in the same axial plane. The scrap produced by the trimmer is in the form of a "trim ring." Though simple in principle, the trimming operation is critical, since burrs or other irregularities left on the open edge of the can body wall will produce defective cans downstream in subsequent necking and flanging operations. The complexity of the necking and flanging operations makes it difficult to diagnose such problems as originating in the trimmer. Consequently, keeping the various parts of the trimmer in precise alignment is critical.

All known existing trimmers of which I am aware are similar to lathes, in that the bottom of the can is held by external vacuum to a base pad, while the open end of the can is trimmed by shearing. The shearing may be done against a single sickle knife, or by rotating knives within a cartridge. This means that the base pad must be mounted for axial movement to bring the can to a position where the knives can trim its open end. Such known apparatus are quite complex, and adjustment is difficult and tedious because in the lathe-like arrangement the can must bridge the base pad and the tooling holding the open end of the can for cutting by the knives, whereby these parts of the trimmer are remote from each other in terms of how they support the structure of the trimmer. In actuality, the "lathe" is typically one of a number of stations in a rotating turret. Typically, these turrets rotate about a horizontal axis.

DISCLOSURE OF THE INVENTION

It is accordingly one object of the present invention to trim the open end of the can body without forming burrs or other irregularities on the remaining open edge of the can body wall.

Another object is to trim the open end while supporting the can body on the same structure which supports the trimming elements.

Yet another object is to provide the trimming elements and the can supporting element in the same structure which is a cartridge assembly that may be mounted to a rotating turret at circumferentially spaced intervals to provide for plural trimming stations.

Still a further object is to be able to adjust trim height and trim quality in a self-contained cartridge which allows for set-up and quality verification in the tool room before being placed in production.

Apparatus for trimming a can body along a cylindrical open end thereof, in accordance with the present invention, comprises a support spindle and an annular outer shearing element having an inner diameter greater than the outer diameter of the can body open end. A cylindrical inner shearing element having an outer diameter less than the inner diameter of the can body open end is mounted coaxially around the spindle with the outer shearing element. These elements are sufficiently radially spaced from each other to receive the open end of the can therebetween. A displacement arrangement radially displaces the inner and outer shearing elements in relation to each other and against a portion of the can body defining the open end to thereby shear the can body.

The inner shearing element is preferably formed with a radiused trimming edge and the outer shearing element is formed with a sharp cutting edge. Preferably, the two elements and the spindle are non-rotatable with respect to the longitudinal axis of the can body, which eliminates the need for bearings providing rotatable support in relation to a turret disk to which the trimming apparatus is mounted.

To provide a self-contained unit, the apparatus further features a mandrel mounted on the spindle for supporting the can body.

The trimming apparatus of the preferred embodiment is a trimmer cartridge assembly, identical ones of which are mounted to a rotating turret disk at circumferentially spaced intervals from each other. Each cartridge assembly includes the cartridge spindle which is non-rotatably mounted to the turret such as with a cartridge retainer bracket. A drive gear is mounted on the non-rotatable spindle for rotation relative to the cartridge spindle axis. The drive gear meshes with a stationary ring gear mounted adjacent the turret to rotate on the spindle during orbital rotation of the cartridge about the turret.

The displacement arrangement preferably includes a penetrator hub mounted on the cartridge spindle concentrically about the inner shearing element which is in the form of an inside penetrator having the trimming edge. The penetrator hub includes an outer generally cylindrical cam profile surface engageable with a cylindrical cam follower surface which is formed on a cam follower roller attached to the drive gear. More specifically, this cam follower roller is attached to an axial face of the drive gear with a cam follower bracket which locates the roller in co-planar relation to the cam profile surface of the penetrator hub located radially inwardly adjacent thereto.

Therefore, in the preferred embodiment, as the drive gear rotates about the cartridge spindle axis, it in turn causes orbital rotation of the cam follower roller which always rotates equidistant from the cartridge spindle axis. As a result, this cam follower roller gradually contacts the entire periphery of the cam profile surface of the penetrator hub which does not rotate relative to the cartridge spindle axis. In this manner, the penetrator hub and thereby the inner shearing element are gradually radially inwardly displaced towards the cartridge spindle axis so that the diametrically opposed portion of the trimming edge is radially outwardly displaced from the spindle axis to intersect the can body and overlap with the outside knife cutting edge to generate cutting forces which trim the can body as the entire circumferential extent of the trimming edge is gradually cammed into the aforesaid trimming contact.

Since the cartridge spindle, can body, and inner and outer shearing elements need not rotate relative to the cartridge spindle axis, i.e., only the drive gear and cam follower roller mounted thereon rotate, the cartridge spindle can advantageously be bolted or otherwise secured directly to the turret without the requirement of expensive bearings and the need for replacement thereof. The non-rotatable nature of the cartridge assembly of the preferred embodiment also eliminates the need for seals which must be replaced at frequent intervals.

In accordance with other features of the invention, the penetrator hub is mounted forwardly adjacent to the drive gear through plural screws respectively passing through a series of circumferentially spaced first through bores formed in the hub. The screws extend through spacers in the first through bores which permit radial displacement of the hub relative to the spindle axis. The screws terminate in a plate non-rotatably mounted on the cartridge spindle between the drive gear and penetrator hub. The outer shearing element is an outside knife extending around the can body axially forwardly of the penetrator hub. The knife may be mounted around the spindle with the same screws. The spacers serve to axially space the knife cutting edge from the trimming edge of the inside penetrator. The penetrator hub may also include a second series of through bores alternating between the first through bores to receive a plurality of centering arrangements which serve to center the inside penetrator trimming edge on the spindle axis when camming radial displacement forces are not acting the penetrator hub. In the preferred embodiment, the centering arrangements respectively comprise a spherical ball and a spring disposed in each second through bore. The spherical ball is operable to project axially slightly from one of the axial faces of the penetrator hub and into a seating bore formed coaxially adjacent the associate second through bore. The spherical balls are normally urged into seating contact with the seating bores by the springs when no radial displacement camming forces are exerted against the penetrator hub. The balls are operable to retract within the second through bores when radial displacement camming forces radially displace the penetrator hub relative to the seating bores. When these camming forces are released from the penetrator hub, the spring-biased balls are operable to rapidly re-center the penetrator hub and thereby the trimming edge relative to the spindle axis.

In accordance with another important feature of this invention, a mandrel is mounted to the support shaft for supporting the can body on the spindle. The mandrel avoids the need for separate base pad assemblies. The mandrel allows the cartridge to be self-contained and also facilitates the use of a grindable trim height spacer mounted on the spindle axially between the mandrel and the inner and outer shearing elements. This trim height spacer is operable to control the extent to which the can body open end is trimmed, i.e., trim height. This enables the cartridge assembly to be adjusted and checked within a tool room before mounted to a production machine.

In accordance with another feature of the preferred embodiment, a nose cone insert of a type commonly used in bottom former tooling may be provided with a central recessed opening through which the front end of the spindle projects to receive a nut securing the nose cone insert to the front end of the mandrel. The forward end of the nose cone insert is provided with a profiled contour corresponding to a predetermined type of can body bottom. This will facilitate use of the trimmer cartridge of the preferred embodiment with a variety of different can body bottoms. A series of vacuum passageways may extend through the cartridge spindle to provide vacuum to the bottom face of the mandrel and the insert projecting forwardly from the cartridge. This will facilitate rapid and secure seating of the can bottom on the mandrel with the can body open end projecting between the inner and outer shearing elements. These shearing elements, when in centered position about the shaft axis, define an ejection slot spaced forwardly from an annular trim ring discharge chamber formed between the annular shearing element and the displacement arrangement. The trimming plane is located at the interface with the ejection slot when the aforesaid radial displacement occurs and the resulting annular trim ring is contained within the discharge chamber after the trimming edge is returned to its inside centered position.

In the preferred embodiment, the annular trim ring discharge chamber is formed by a series of overlapping third through bores concentrically arrayed around the cartridge spindle axis in the penetrator hub. Each of these third through bores receives an ejector pin which is slidably mounted within its through bore. The inside penetrator defines the forward extent of travel of the associated ejector pin. Each third through bore communicates with a source of pressurized air which propels the ejector pins through the chamber to quickly and easily discharge the trim ring from the apparatus after trimming.

The front face of the penetrator hub is preferably formed with a shoulder adapted to receive the inside penetrator which, in the preferred embodiment, is a thin disk-shaped ring formed with the trimming edge. Since the inside penetrator is a wearable item, the feature of forming it as a thin disk-shaped ring with little mass advantageously minimizes the cost of replacement without sacrificing trimming quality.

In another embodiment, the trimming apparatus is a trimmer cartridge assembly, identical ones of which are mounted to a rotating turret disk at circumferentially spaced intervals from each other. Each cartridge assembly includes a cartridge housing having a support spindle projecting from the cartridge spindle which is rotatably mounted through bearings to the housing. A cartridge retainer is mounted to the spindle for connecting the cartridge to the turret disk so that the cartridge assembly co-rotates with the disk about the turret central axis of rotation. A drive gear is mounted for co-rotation with each shaft. The drive gear meshes with a stationary ring gear mounted adjacent the turret to thereby rotate the inner and outer shearing elements together with the shaft about the cartridge shaft axis during orbital rotation of the cartridge about the turret.

The displacement arrangement further includes a penetrator hub mounted on the shaft concentrically about the inner shearing element which is in the form of an inside penetrator having the trimming edge. The penetrator hub includes an outer cylindrical cam follower surface engageable with a cam surface formed on a stationary cam ring mounted adjacent the stationary ring gear. Radial inward displacement of the penetrator hub under camming action causes corresponding radial inward displacement of the trimming edge toward the turret axis so that the trimming edge intersects the can body and overlaps with the outside knife cutting edge to generate cutting forces which trim the can body as the trimming edge is maintained by camming action radially closer to the turret axis than the cutting edge during orbital movement of the cartridge and simultaneous rotation of the trimming and cutting edges about the shaft axis.

In accordance with other features of this embodiment, the penetrator hub is mounted to the drive gear with plural screws respectively passing through a series of circumferentially spaced first through bores formed in the hub. The screws extend through spacers in the first through bores which permit radial displacement of the hub relative to the shaft axis. The outer shearing element is an outside knife extending around the can body axially forwardly of the penetrator hub. The knife may be mounted around the shaft with the same screws. The spacers serve to axially space the knife cutting edge from the trimming edge of the inside penetrator.

The penetrator hub may also include a second series of through bores alternating between the first through bores to receive a plurality of centering arrangements which serve .to center the inside penetrator trimming edge on the shaft axis when camming radial displacement forces are not acting against the penetrator hub. In this embodiment, the centering arrangements respectively comprise a spherical ball and a spring disposed in each second through bore. The spherical ball is operable to project axially slightly from one of the axial faces of the penetrator hub and into a seating bore formed coaxially adjacent the associated second through bore. The spherical balls are normally urged into seating contact with the seating bores by the springs when no radial displacement camming forces are exerted against the penetrator hub. The balls are operable to retract within the second through bores when radial displacement camming forces radially displace the penetrator hub relative to the seating bores. When these camming forces are released from the penetrator hub, the spring biased balls are operable to rapidly re-center the penetrator hub and thereby the trimming edge relative to the shaft axis.

In accordance with another important feature of this embodiment, a mandrel is mounted to the support shaft for supporting the can body for co-rotation with the shaft. The mandrel avoids the need for separate base pad assemblies. The mandrel allows the cartridge to be self-contained and also facilitates the use of a grindable trim height spacer mounted on the shaft axially between the mandrel and the inner and outer shearing elements. This trim height spacer is operable to control the extent to which the can body open end is trimmed, i.e., trim height. This enables the cartridge assembly to be adjusted and checked within a tool room before being mounted to a production machine.

A series of vacuum passageways may extend through the cartridge spindle and the mounting shaft as well as the mandrel so as to provide vacuum to the bottom face of the mandrel projecting forwardly from the cartridge. This will facilitate secure seating of the can bottom on the mandrel with the can body open end projecting between the inner and outer shearing elements. These shearing elements, when in centered position about the shaft axis, define an ejection slot spaced forwardly from an annular trim ring discharge chamber formed between the inner shearing element and the displacement arrangement. The trimming plane is located at the interface with the ejection slot when the aforesaid radial displacement occurs and the resulting annular trim ring is contained within the discharge chamber after the trimming edge is returned to its inside centered position. A piston ring disposed within the chamber is then actuated with pressurized air to propel the trim ring through the chamber, then toward and through the ejection slot to quickly and easily discharge the trim ring from the apparatus.

The forward end wall defining the front end of the chamber and the entrance to the ejection slot is preferably formed by a pair of oppositely and forwardly inclined inner and outer surfaces which are radially spaced from each other to define the beginning of the ejection slot and such that the trim ring being ejected from the chamber through the slot will be guided by the inclined surfaces. The outer one of these inclined surfaces is formed rearwardly adjacent the cutting edge of the outside knife and preferably has an inner diameter which is slightly less than the inner diameter of the knife cutting edge to prevent the trim ring from contacting and jamming against the cutting edge during forcible ejection.

In accordance with a further feature of the invention, apparatus for trimming a can body along a cylindrical open end thereof comprises a cartridge assembly including a cartridge spindle for mounting the cartridge to a support structure. A support shaft operatively connected to the cartridge spindle through bearings is rotatable relative to the spindle about the shaft axis which defines a trimming axis on the cartridge. First and second elements being respectively formed with a trimming edge and a cutting edge are mounted coaxially around the support shaft and are radially spaced from each other to receive the open end of the can body therebetween. A displacement arrangement for radially displacing the trimming and cutting edges in relation to each other and into a portion of the can body defining the open end to thereby shear the can body is also provided.

This cartridge assembly is preferably mounted to a turret disk through the spindle such that the cartridge assembly is co-rotatable with the turret disk about a turret axis of rotation which is parallel to the cartridge trimming axis. Means is provided for rotating the inner and outer elements about the cartridge shaft axis during orbital rotation of the cartridge about the turret axis.

A method of trimming a cylindrical open end portion of a can body, in accordance with this invention, comprises the steps of directing the cylindrical open end portion in an axial direction so that it is located radially between a pair of inner and outer shearing elements. The inner and outer shearing elements are then radially displaced in relation to each other and against the open end portion of the can body to thereby shear it from the can.

In the preferred embodiment, the can body as well as the inner and outer shearing elements are non-rotatable with respect to the can body longitudinal axis. Instead, a cam follower roller mounted for co-rotation with a drive gear orbits the inner shearing element at a constant radial distance from the can body axis. This cam follower orbital roller contacts a cam profile surface associated with the inner shearing element to progressively displace the entire circumference of the trimming edge on the inner shearing element into contact with the can body open end.

The can body may also be rotated about the cartridge axis during the aforesaid radial displacement so that the inner and outer shearing elements gradually contact the entire periphery of the open end portion to trim it from the can body. The inner shearing element is preferably formed with a radius trimming edge and the outer shearing element is formed with a knife cutting edge. It is the trimming edge which is preferably radially displaced into contact with the end portion while the can body and knife cutting edge remains centered on a common axis.

In accordance with other method features, the common axis is located on a rotating turret at a fixed radial distance from the turret central axis of rotation. The inner trimming edge is offset during trimming so as to be located radially closer to the turret axis than the can body and the knife cutting edge as the common axis forwardly rotates around the turret axis. By either rotating the cam follower roller about the inside shearing element, or the trimming and cutting edges as well as the can body about the common cartridge axis during orbital rotation about the turret axis while maintaining the trimming edge radially closer to the turret axis in the aforesaid manner, the can is progressively cut.

In accordance with another feature of the method of this invention, when the radial displacement cam forces are released, the inner trimming edge is quickly returned to a centered position on the common axis by the use of spring-loaded centering balls.

After trimming, the trim ring is forcibly ejected from between the inner trimming edge and outer cutting edge using a forcible ejecting member propelled with compressed air. In accordance with a preferred method feature, the forcible ejecting member is preferably a series of ejector pins defining the bottom of an annular trim chamber located rearwardly from the inner trimming edge and outer cutting edge. The use of individual plural ejector pins prevents jamming of the trim ring within the chamber during forcible ejection.

In accordance with another method feature, the can body is preferably mounted to a mandrel supported on the common axis. The location of the can body open end portion along this axis may be adjusted by the use of a trim height spacer mounted between the mandrel and the inner and outer elements.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 10 is a sectional view of the penetrator hub only of the preferred embodiment of FIG. 8; and FIG. 11 is a right side end plan view of the penetrator hub only of FIG. 10.

BEST MODE FOR CARRYING OUT THE INVENTION

Figure 1:
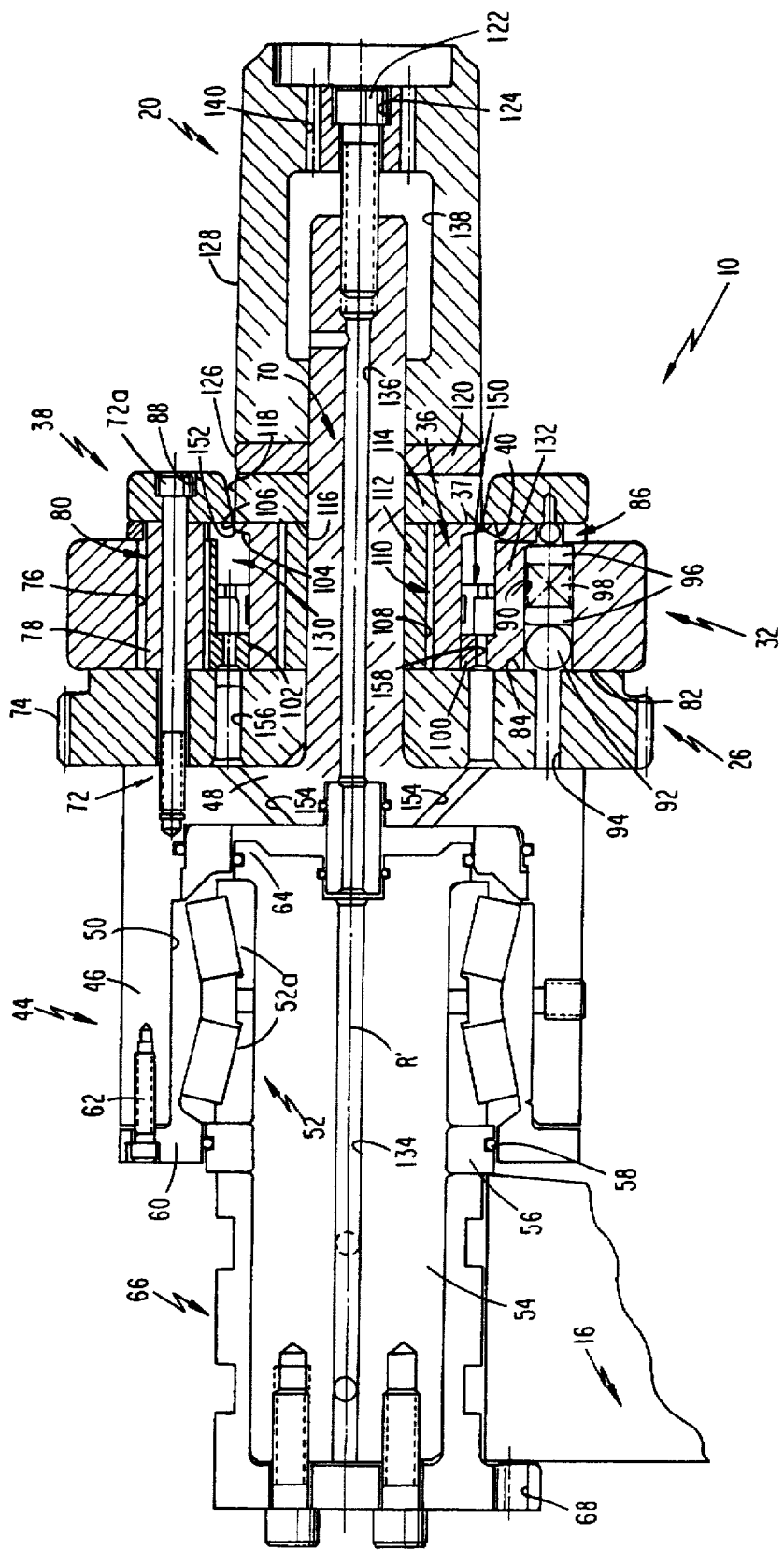
FIG. 1 is a sectional view of a trimmer cartridge assembly in accordance with one embodiment of the present invention.
Figure 2:
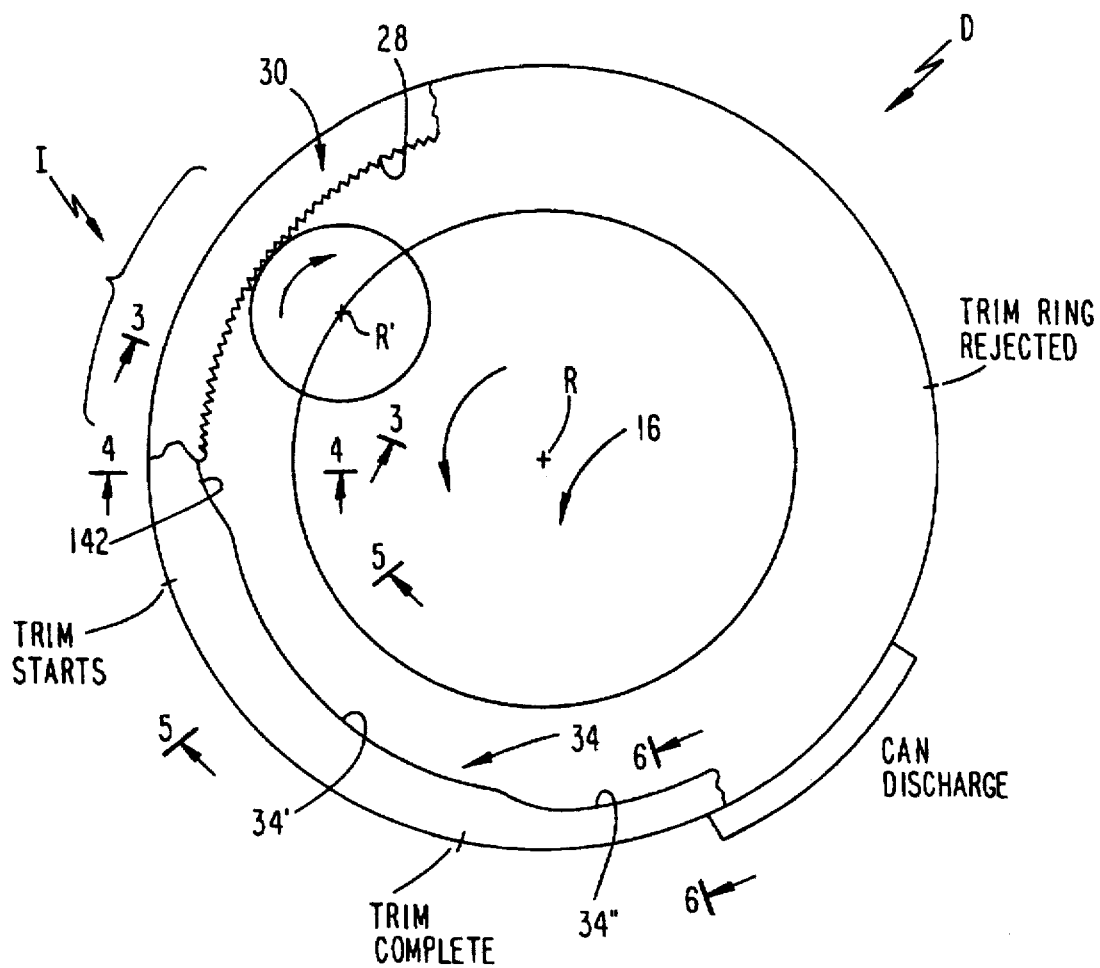
FIG. 2 is a schematic view of a trimming machine incorporating a plurality of identical trimmer cartridge assemblies mounted to a rotating turret disk, only one of which cartridges is depicted for simplicity of drawing.
Figure 3:
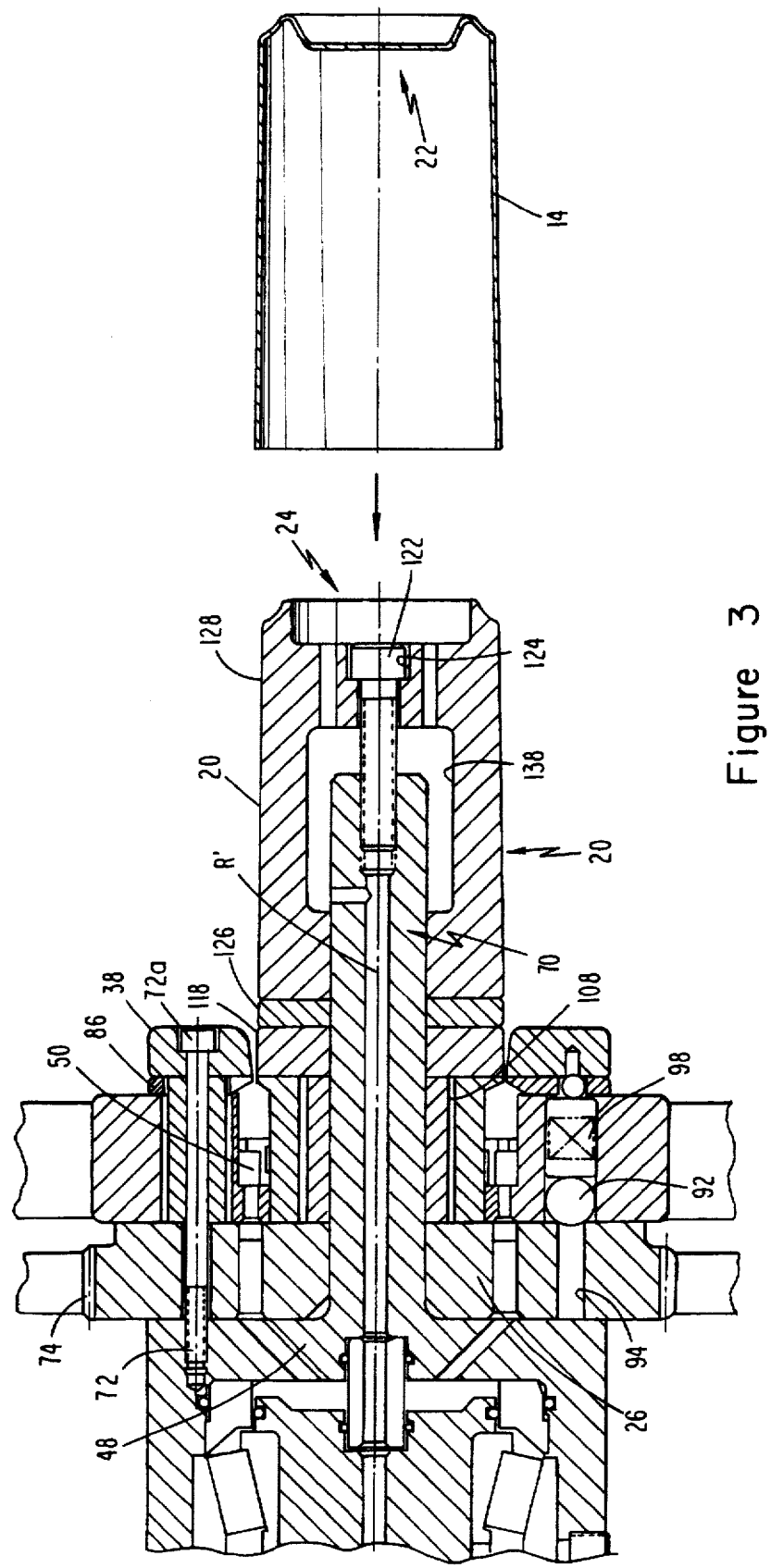
FIG. 3 is a partly sectional and partly schematic sequential view depicting a can body about to be fed onto a trimmer cartridge assembly proximate the sectional line 3—3 of FIG. 2.
Figure 4:
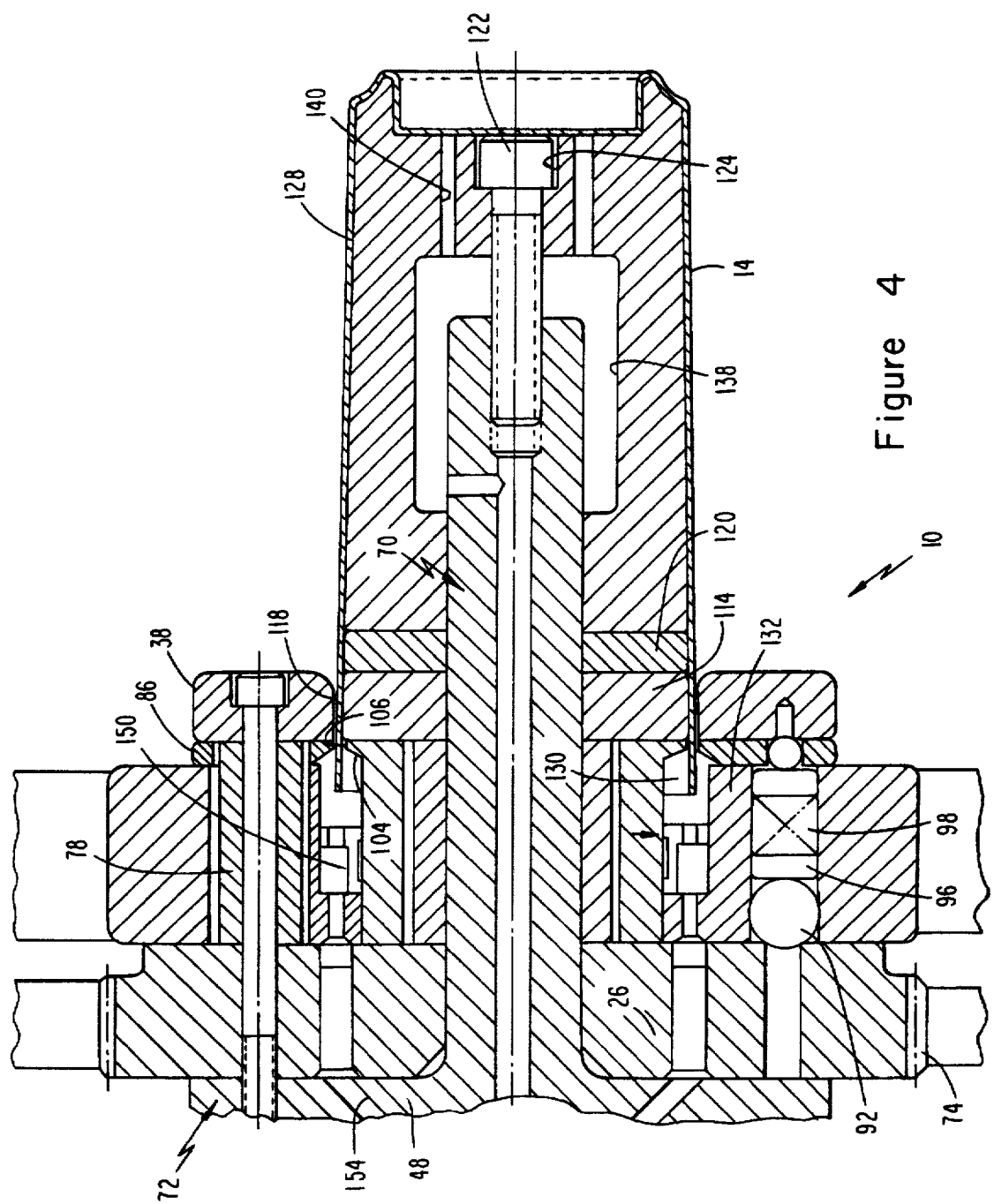
FIG. 4 is a sequential view similar to FIG. 3 but depicting the untrimmed can body seated within the cartridge assembly in a location proximate sectional line 4—4 of FIG. 2.
Figures 5, 5A:
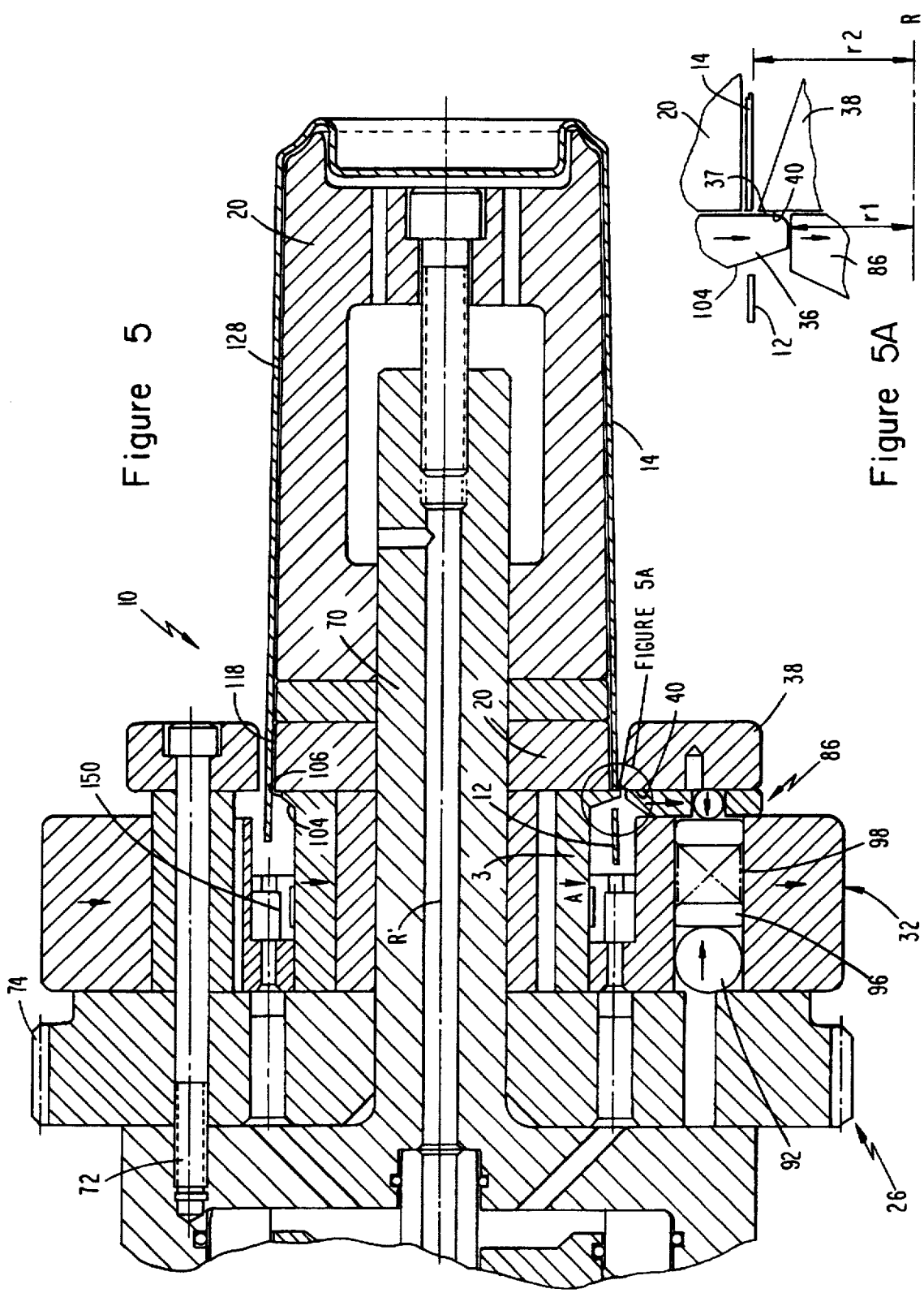
FIG. 5 is a sequential view similar to FIGS. 3 and 4 to depict the can body during trimming such as along sectional line 5—5 of FIG. 2.

Reference is now made to FIGS. 1 through 5 wherein a trimmer cartridge assembly 10 of the invention is depicted for use in circumferentially cutting off the top edge portion 12 (e.g., ¼ inches) defining the open end of a can body 14 so as to provide a side wall having a uniform height and smooth, uniform edge which is free of burrs or other irregularities. As schematically depicted in FIG. 2, a plurality of trimmer cartridge assemblies 10 are mounted at circumferentially spaced intervals to the periphery of a disk turret 16 having a horizontal axis of rotation R. Can bodies 14 which have been formed in a draw and iron press (not shown) in a known manner are respectively and sequentially fed via a star transfer wheel onto one of the trimmer cartridges 10 as the cartridge rotates about axis R to an infeed location I in coaxial alignment with the transfer wheel. In accordance with the unique features described below, the can body is pushed open end first onto a mandrel 20 (FIG. 3) of the cartridge 10. Vacuum is then applied through the mandrel 20 to firmly seat the can bottom 22 against the mandrel bottom 24 (FIG. 4), thereby eliminating the need for separate base pad assemblies. As the cartridge assemblies 10 respectively rotate about turret axis R, they in turn rotate about their individual horizontal axes of rotation R' (parallel to axis R) as a result of meshing engagement between a cartridge drive gear 26 mounted to each cartridge, with the internal teeth 28 of a large diameter stationary ring gear 30 mounted to a stationary support frame (not shown) adjacent the turret 16. A cam follower or penetrator hub 32 mounted within each cartridge assembly 10 in the unique manner described below is pushed radially inwardly towards the turret axis R as a result of contact with a large diameter stationary cam ring 34 also mounted to the stationary support frame parallel to and adjacent the ring gear 30. Both ring gear 30 and cam 34 are coaxial with axis R. The cam follower 32 actuates an inside penetrator 36 disposed within the cartridge 10 and whose outside diameter is slightly smaller than the inside diameter of the can body 14. In this manner, the inside penetrator 36 is displaced radially inwardly towards turret axis R so that its inside penetrator trimming edge 37 contacts with the can body side wall (FIG. 5). This trimming edge is further displaced by cam 34 to radially urge the can body side wall into cutting engagement with an outside cutting knife 38 mounted within the cartridge assembly 10 and whose inside diameter cutting edge 40 is slightly larger than the outside diameter of the can body 14.

As the cartridge 10 rotates about turret axis R along a predetermined arcuate interval, the inside penetrator trimming edge 37 is held by the cam 34 in a radial position r1, relative to turret axis R, which is radially inward of the can body side wall located at a radially innermost position r2, wherein r1<r2. Since the can body 14 and outside cutting knife 38 always co-rotate about the cartridge axis R' in a concentric manner while the inside penetrator trimming edge 37 is radially offset, the open end of the can is gradually trimmed as a result of shearing between the knife and inside penetrator edges 37,40.

After cutting, the cam follower 32 advances out of radially inward camming contact with the cam ring 34 which allows the radially offset inside penetrator 36 to now be re-centered on the cartridge axis R'. Once re-centered in the unique manner discussed infra, pressurized air is used to rapidly eject the trim ring 12 (FIG. 6) from the cartridge assembly 10 after the trimmed can body has been removed from the mandrel 20 with compressed air onto a discharge star wheel.

Each cartridge assembly 10 includes a cartridge housing 44 having a cylindrical side wall 46 and a bottom wall 48 which defines a cylindrical cavity 50 adapted to receive a pair of roller bearings generally designated with reference numeral 52. A cartridge support spindle 54 in contact with the inner set 52a of roller bearings 52 projects rearwardly from the cavity 50 through a spindle wear ring 56 stationarily mounted on the spindle. Wear ring 56 has an outer O-ring seal 58 in sealing sliding contact with a bearing retainer 60 bolted at 62 to the rear end face of the cylindrical housing side wall 46. The forwardmost end of the cartridge spindle 54 is flanged at 64 to define a step which is captured against the inner roller bearing set 52a to prevent axial withdrawal of the cartridge spindle from the housing 44. The rearwardly projecting end of the spindle 54 supports a cartridge retainer 66 which is used to bolt the cartridge 10 to the periphery of the turret disk 16 as at 68.

The roller bearings 52 are concentrically mounted in relation to the longitudinal axis R of the cartridge spindle 54. In this manner, the non-rotational spindle 54 supports the cartridge assembly 10 on the turret disk 16 while allowing the cartridge housing 44 to rotate coaxially about the cartridge spindle axis R'. This cartridge housing 44 is further formed with a cylindrical support shaft 70 projecting forwardly from the cartridge housing bottom wall 48 in coaxial alignment with the cartridge spindle 54. This support shaft 70 co-rotates with the cartridge housing 44 about axis R' during orbital rotation about turret axis R. To rotate the cartridge assembly 10 about axis R', the cartridge drive gear 26 is mounted on the support shaft 70 in concentric alignment with the cartridge axis R' and secured to the annular forward face of the cartridge housing bottom wall 48 with circumferentially spaced screws 72. The gear teeth 74 of gear 26 are located in meshing contact with the internal gear teeth 28 of the stationary ring gear 30 having a diameter slightly greater than the turret diameter.

The penetrator hub 32 is mounted on the support shaft 70 axially forwardly adjacent the cartridge drive gear 26 for co-rotation therewith. Penetrator hub 32 includes a first series of through holes 76 which are circumferentially spaced from each other and are adapted to respectively receive cylindrical spacers 78 having an outer diameter which is less than the inner diameter of the through hole to define an annular clearance 80 therebetween. The screws 72 which are used to secure the cartridge drive gear 26 to the cartridge housing wall 48 may extend through these spacers 78 to mount the hub. The penetrator hub 32 has a flat rear axial face 82 which is adapted to be in radial sliding contact with the flat front face 84 of the cartridge drive gear 26, when the aforesaid camming movement occurs, as a result of precise axial positioning achieved with the spacers 78.

A trim ring locator spacer 86 is mounted with the screws 72 to engage the front axial face of the penetrator hub 32. The outside cutting knife 38 is in turn mounted axially forwardly adjacent the trim ring locator spacer 86 which serves to precisely locate the outside cutting edge 40 in the same shearing plane with inside trimming edge 37. The screw head 72a of each screw 72 is captured within a countersunk bore 88 formed in the front face of the knife 38.

A second series of axial through bores 90 are formed in the penetrator hub 32 at circumferentially spaced intervals from each other in alternating relation with the first through bores 76. These second though bores 90 are concentrically arrayed about cartridge axis R' and may be of smaller diameter than the first through bores 76. A spherical ball 92 in each bore 90 is spring-biased to protrude rearwardly from the rear face 82 of the penetrator hub 32 into normal seating contact with a smaller diameter seating through bore 94 in the drive gear 26 in coaxial alignment therewith. The spring mechanism comprises a pair of spring pads 96 with a compressed spring 98 therebetween located in a forward portion of the second through bore 90 which urges the steel ball 92 into the aforesaid seating contact. When properly seated in these seating bores 94, the penetrator hub 32 is precisely concentrically mounted on the support shaft 70 which in turn centers the inside penetrator 36. Radial displacement of the penetrator hub 32 by the cam 34 causes the steel balls 92 to completely retract within the second through bores 90 as they are offset out of coaxial alignment with the seating bores 94 when the rear face 82 of the penetrator hub slides in the radially inward direction A against the stationary front face 84 of the cartridge drive gear 26. When the cam surface 34 returns to a neutral position in concentric alignment with the turret axis R, the spring biased balls 92 quickly and positively re-center the penetrator hub 32 on the support shaft 70 as a result of spring biased re-seating of the balls within the seating bores 94.

The penetrator hub 32 is further formed with a stepped center portion 100 defining a central opening 102 through which projects the inside penetrator 36, in contact therewith. As a result, the inside penetrator 36 is normally centered on the support shaft 70 through the spring-loaded centering balls 92. The inside penetrator 36 is a generally cylindrical member of constant inner and outer diameter, except at the front end thereof which is of larger diameter as defined by a frusto-conical surface 104 flaring radially outwardly towards the trim ring locator spacer 86 and which terminates in an axially extending outer cylindrical surface 106. The surface 106 terminates at the front axial face of the inside penetrator 36 to define therewith the inside trimming edge 37 which is slightly spaced rearwardly from and parallel to the axial plane of the outside knife cutting edge 40.

The inner cylindrical surface 108 of the inside penetrator 36 forms an annular clearance 110 with a cylindrical spacer 112 concentrically mounted to the support shaft 70. This inside penetrator spacer 112 cooperates with the penetrator hub spacers 78 by contacting the rear face of a penetrator retainer 114 to establish a predetermined axial spacing between the trimming edge 37 and the cartridge drive gear 26 so as to allow for smooth sliding, radially inward movement of the penetrator hub 32 and inside penetrator 36 during the aforesaid camming displacement, while ensuring that surfaces 37,40 slide past each other in a shearing plane.

The penetrator retainer 114 is in the form of a substantially cylindrical plate-shaped member which is concentrically mounted on the support shaft 70 forwardly adjacent the inside penetrator 36 and the penetrator spacer 112. More specifically, the flat rear face 116 of the penetrator retainer 114 is in abutting contact with the front end faces of both the inside penetrator and the penetrator spacer. The outer annular surface 118 of the penetrator retainer 114 is tapered in the forward direction to form a continuous surface with the axially extending large diameter surface 106 formed in the front end portion of the inside penetrator 36 to allow the can open end to slide easily between the trim ring locator spacer 86 and the inside penetrator as the can body is being seated by vacuum on the mandrel 20.

In accordance with a unique feature of this invention, a grindable trim height spacer 120 is concentrically mounted on the support shaft 70 forwardly adjacent the penetrator retainer 114. The substantially cylindrical mandrel 20 is in turn mounted on the support shaft 70 to extend forwardly adjacent from the trim height spacer 120. A cap screw 122 received in a countersink 124 in the front face of mandrel 20 is adapted to clamp the assembly of the mandrel, grindable spacer, penetrator retainer and inside penetrator to the support shaft 70 in that order. The outer cylindrical surfaces 118, 126 and 128 of the penetrator retainer 114, trim height spacer 120 and mandrel 20, respectively, are tapered in the forward direction to enable the can body side wall to be smoothly guided by these surfaces onto the mandrel so the inside surfaces of the can body bottom may seat firmly against the forward end of the mandrel under the action of vacuum supplied through the mandrel as described more fully below. In this seated position (FIG. 4), the open end of the can body side wall extends axially rearwardly past the forward portion 104 of the inside penetrator 36 (now disposed within the can body open end) and into an annular cavity 130 formed between the constant diameter portion of the inside penetrator 36 and a constant diameter portion 132 of the penetrator hub 32 defining the forward extent of the hub center opening 102.

The operating sequence for trimming the open end of a can body with a trimmer cartridge of this invention will now be explained. As previously mentioned, the untrimmed can body 14 is initially fed onto one of the mandrels 20 of a trimmer cartridge 10 as the mandrel rotates about turret axis R through infeed location I (FIG. 2) in coaxial alignment with the can body being fed to it with a star transfer wheel 18. When the can body 14 is coaxial with the cartridge axis R', vacuum is supplied from an external vacuum source through a series of connected longitudinally extending vacuum passageways 134 and 136 in the cartridge spindle 54 and support shaft 70, respectively, which communicate with the front end face of the mandrel 20 through a vacuum chamber 138 and a plurality of short vacuum passageways 140 to rapidly suck the can onto the mandrel until the can bottom is firmly seated against the front face of the mandrel (FIG. 4). The open end of the can body now projects axially rearwardly into chamber 130, i.e., past the outside knife 38 and the inside penetrator trimming surface 37 which are maintained in a centered position with the spring-loaded centering ball arrangements 92.

As the trimmer cartridge 10 continues its movement about turret axis R, the cam surface 34 begins to ramp, as at 142, in a radially inward direction towards turret axis R, which has the effect of displacing the penetrator hub 32 in the radially inward direction towards axis R. This in turn displaces the inside penetrator 36 to an offset position as depicted in FIG. 5. This displacement occurs as a result of the annular clearances 76 formed between the penetrator hub 32 with the hub spacers. 78 as well as the clearance 110 formed between the inside penetrator 36 with the penetrator spacer 112.

The aforesaid radial displacement causes the inside penetrator trimming edge 37 to be radially inwardly displaced to radius r1, relative to turret axis R, so that it extends beyond the can body side wall to create a shearing cutting action in cooperation with the outside knife edge 40 which remains centered on cartridge axis R' and therefore at the fixed radially outward location r2 from the turret axis R relative to the offset, radially inward location r1 of the inside penetrator trimming edge. The inside trimming edge 37 is caused to remain at its offset radially inward location r1 by a portion 34' of the cam surface which subtends a predetermined arcuate interval relative to turret axis R such that the differential between radii r1 and r2 (r1<r2) is preferably about 0.040 inches). Since the inside penetrator trimming edge 37 is located radially inward from the outside knife cutting edge 40 during co-rotation of the can and cartridge about cartridge axis R', this has the advantageous effect of causing the penetrator trimming edge and the outside knife cutting edge to generate shearing cutting forces along the entire periphery of the can open end to thereby trim the open end.

After trimming occurs, the cartridge 10 continues to rotate about axis R to a portion of the stationary ring cam 34 provided with a larger radius cam surface 34". By virtue of the spring-biased centering ball mechanisms 92, the penetrator hub 32 is quickly restored to its centered position which in turn restores the inside penetrator 36 to its centered position out of cutting contact with the outside knife 38.

Figure 6:
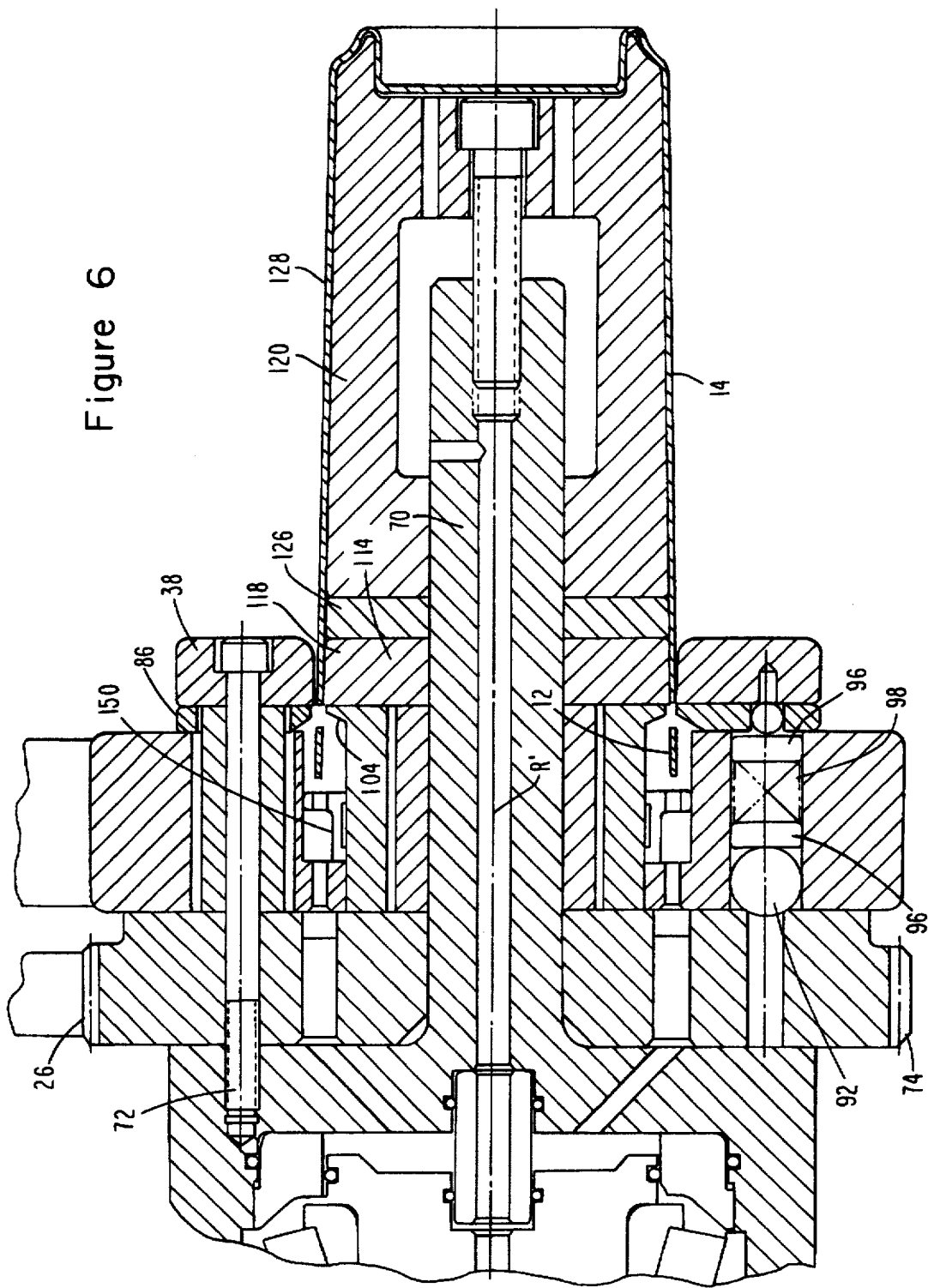
FIG. 6 is a view similar to FIGS. 3–5, along sectional line 6—6 of FIG. 2, after trimming has occurred and prior to forcible ejection of the trim ring from the cartridge.

The cartridge 10 now advances along the rotating turret 16 about axis R to a can discharge location D wherein pressurized air is now supplied through the vacuum passageways 134,136,138,140 to rapidly eject the trimmed can from the mandrel 20. Further advancement of the cartridge 10 on the rotating turret 16 is operable to rotate the cartridge assembly into communication with a source of pressurized air which supplies pressurized air into the annular ejection chamber formed between the outside surface of the inside penetrator 36 and the inside, axially forwardly extending surface of the penetrator hub 32 to quickly advance a piston like trim ejector ring 150 in the forward direction into contact with the trim ring 12 (FIG. 6). This has the effect of rapidly ejecting the trim ring 12 through the ejection slot formed between the opposing surfaces 152 and 106 of the trim ring locator spacer 86 and the inside penetrator 36, respectively, to propel the trim ring from the cartridge 10. This pressurized air is supplied to the trim ring ejection chamber 130 from passageways (not shown) in spindle 54 through a series of slots 154 formed in the bottom wall 48 of the cartridge housing 44 which are in communication with a series of circumferentially spaced through bores 156 in the cartridge drive gear 26 in coaxial alignment with respective through bores 158 in the center portion 100 of the penetrator hub 32.

The trimmer cartridge 10 of the present invention is possessed of numerous advantages which enable it to rapidly trim can bodies with minimal, if any, generation of burrs and slivers. For example, incorporation of a mandrel 20 within the cartridge assembly 10 for supporting the can body 14 advantageously eliminates the need for separate base pad assemblies and base pad turrets and possible misalignment problems and accuracy in positioning associated therewith. Furthermore, the mandrel 20 facilitates the use of the grindable spacer 120 which easily allows the technician to set trim height and check trim quality in the tool room before the cartridge 10 is placed in a production machine.

In many prior art trimmers of which I am aware, it is critical to have a shearing clearance between the knives which is no greater than ten percent of the metal thickness. Considering that the metal thickness in this area of the can body side wall is about 0.006–0.008 inches, the resulting clearance must be no greater than 0.0006–0.0008 inches; otherwise, burrs will likely result. In the trimmer cartridge 10 of this invention, in contrast, the axial clearance between the outside knife cutting edge 40 and the inside penetrator trimming edge 37 may be as great as 0.005 inches without generating burrs. The invention therefore reduces the need for critical clearances. It is theorized that one reason for this is because the relatively gradual approach of the two cutting elements 37,40 toward each other, over a long arc segment which may subtend an arcuate interval of about 45°, produces opposing forces on the metal being cut which are nearly radial. The more radial and less tangential these forces are, the less tendency it is believed they would have to cause circumferential bending or buckling of the can body or circumferential displacement of the can body with respect to the mandrel.

Since the outside knife 38 and the can 14 co-rotate together with the inside penetrator 36, there is no matching point which must be returned to once trimming is initiated.

The feature of centering the penetrator hub 32 with the spring-loaded ball centering arrangements 92 provides a fast and reliable mechanism for re-centering the inside penetrator 36 after trimming is completed. Once the inside penetrator 36 re-centers itself, the trim ring 12 is now located within the annular ejection chamber 130 which is centered with the tapered ejection slot defined between the trim ring locator spacer/outside knife on the outer side, and the forward tapered end of the inside penetrator/penetrator retainer on the inner side, each side being provided with tapered entrance surfaces providing a smooth transition from the chamber to the ejection slot which prevents the trim ring from hanging up on the outside knife surface.

In the present invention, the outside knife cutting edge 40 is sharp while the trimming edge 37 defined by the front face of the inside penetrator with the axially extending cylindrical surface 106 is actually radiused (e.g., 0.003–0.006 inches). In this manner, trimming actually occurs from the inside out so that any burrs likely to be generated will be formed on the trim ring 12 and not on the can body 14.

Figure 7:
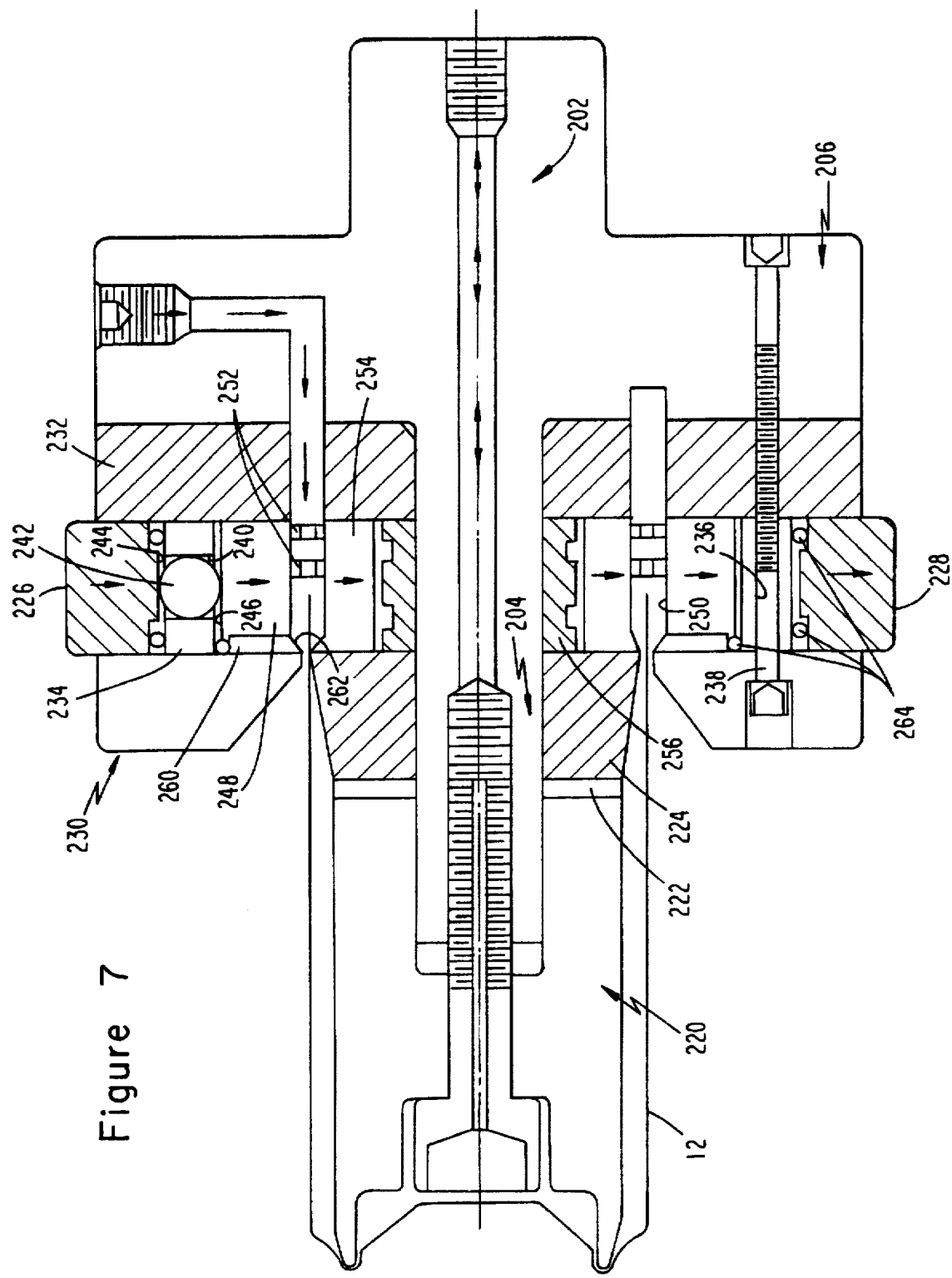
FIG. 7 is a sectional view, partly schematic, of a second embodiment of this invention.

FIG. 7 is a sectional view illustration of a second embodiment of a trimmer cartridge 200 wherein a cartridge spindle 202 is integrally formed with a support shaft 204 for co-rotation with a large diameter trimmer assembly mounting flange 206. The cartridge spindle 202 is adapted to be received within a set of chucking jaws (not shown) for rotating the trimmer cartridge 200. The support shaft portion 204 receives a mandrel 220 together with a grindable trim height spacer 222 and a penetrator retainer 224 which are functionally equivalent and structurally similar to the corresponding members in the preferred embodiment of FIG. 1.

Trimmer cartridge 200 is also comprised of a penetrator hub 226 having an outer cam follower surface 228 which may be acted upon in a radial direction in the same manner as that of trimmer cartridge 10, discussed supra. This penetrator hub 226 is mounted axially between an outside knife 230 and a wear plate 232 which are axially spaced parallel to each other through a ring-shaped spacer and bearing cage 234 formed with circumferentially spaced through bores 236 adapted to receive screws 238 extending through the knife, cage, wear plate and into the mounting flange for securing the parts together.

At alternating locations between the through bores 236 are formed a series of radial through bores 240 adapted to respectively receive a plurality of spherical balls 242 contacting an inner cylindrical surface 244 of the penetrator hub 226 on the outside and an outer cylindrical surface 246 of a spacer disk 248 located radially inwardly adjacent the spacer and bearing cage 226. The inner cylindrical surface 250 of this spacer 248 in turn slidably supports a stripper piston 252. A trim ring locator washer 260 is mounted between the front face of spacer 248 and outside knife 230 to define the outer inclined surface 262 of the ejection slot. The inside penetrator 254 is located radially inwardly adjacent the stripper piston 252 and a cylindrical inside spacer 256 is mounted on the support shaft 204 to maintain the required axial spacing between the penetrator retainer 224 and the wear plate 232.

The outside knife 230 and inside penetrator 254 operate in the same manner as the corresponding structures in the trimmer cartridge assembly 10 of the preferred embodiment. Unlike the preferred embodiment, however, radial inward displacement of the inside penetrator occurs via displacement of the cam follower 228, balls 242, cylindrical spacer 248, stripper piston 252 and inside penetrator 254 in that order. Re-centering occurs by the use of decompression of O-rings 264 disposed between the penetrator hub 226 and spacer 248 and bearing cage 234 as depicted in the drawing, following compression by squeezing of these O-rings which occurs as the penetrator hub is pressed radially inwardly into contact with the balls causing the latter to move within the radial slots 240 towards the cylindrical spacer.

Reference is now made to FIGS. 8–11 wherein a trimmer cartridge assembly 300 according to a presently preferred embodiment of the invention is depicted for use in circumferentially cutting off the top edge portion 12 (e.g., ¼ inches) defining the open end of the can body 14 so as to provide a side wall having a uniform height and smooth, uniform edge which is free of burrs or other irregularities. As in the case of cartridge assemblies 10, depicted in the FIG. 1 embodiment, supra, a plurality of trimmer cartridge assemblies 300 of the preferred embodiment are also mounted at circumferentially spaced intervals to the periphery of a disk turret 16 having a horizontal axis of rotation R as in FIG. 2. Can bodies 14 which have been formed in a drawn and ironed press (not shown) in a known manner are respectively and sequentially fed via a star transfer wheel 18 onto one of the trimmer cartridges 300 as the cartridge rotates about axis R to an infeed location I in coaxial alignment with the transfer wheel. As in the case of trimmer cartridge assembly 10, the can body is pushed open end first onto a mandrel 320 of the cartridge 300. Vacuum is then applied through the mandrel 320 to firmly seat the can bottom (not shown) against a nose cone insert 324 defining the mandrel bottom, thereby eliminating the need for separate base pad assemblies. As the cartridge assemblies 300 respectively orbit about turret axis R, they do not rotate about their individual horizontal axes of rotation R' (parallel to axis R). However, as a result of meshing engagement between a cartridge drive gear 326 mounted to each cartridge, with the internal teeth 28 of the large diameter stationary ring gear 30 (FIG. 2) mounted to a stationary support frame (not shown) adjacent the turret 16, the inner and outer shearing elements are cam controlled to cut the trim ring from the open end.

Figure 8:
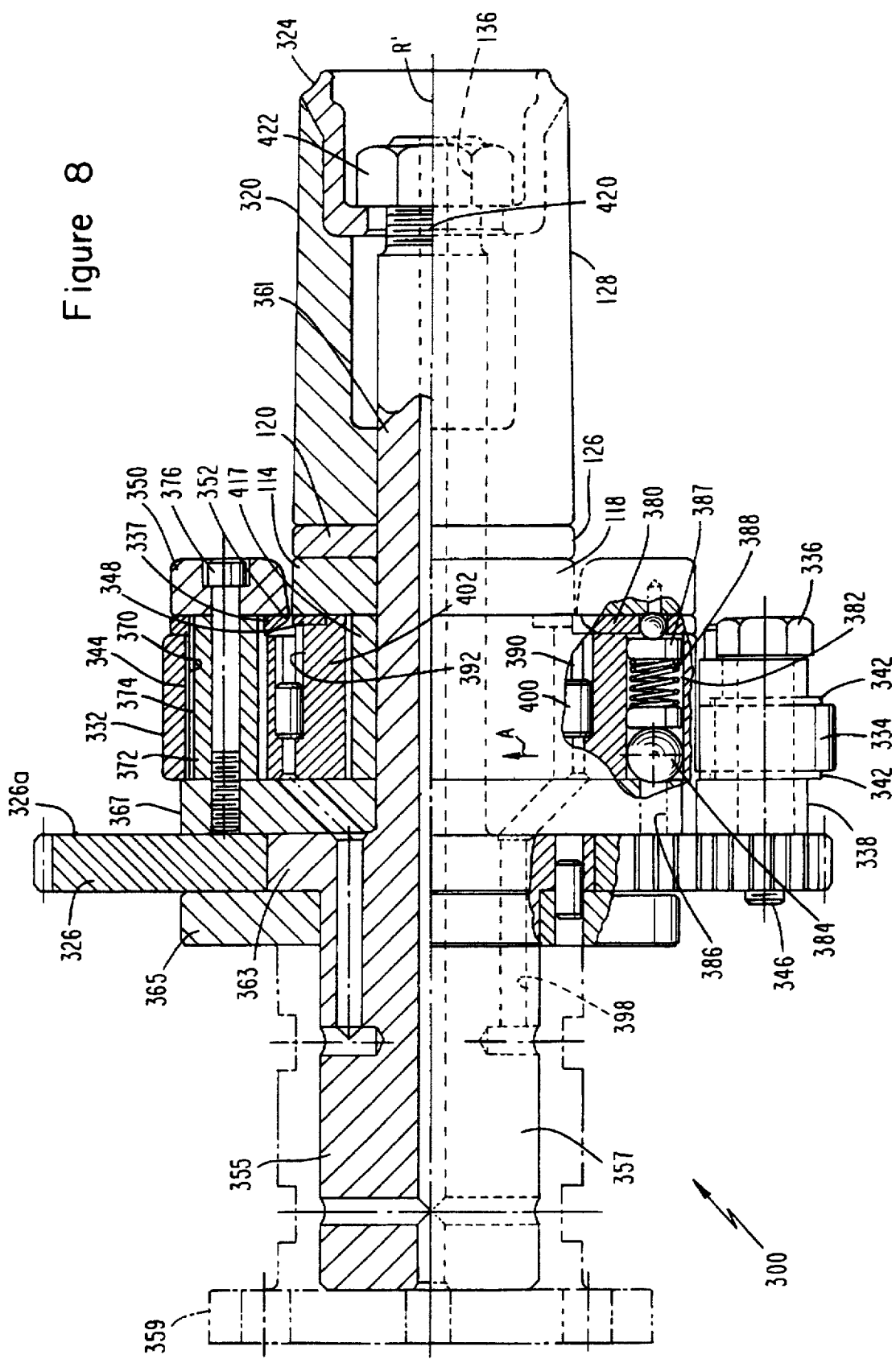
FIG. 8 is a sectional view of a trimmer cartridge assembly in accordance with a preferred embodiment of the present invention.
Figure 9:
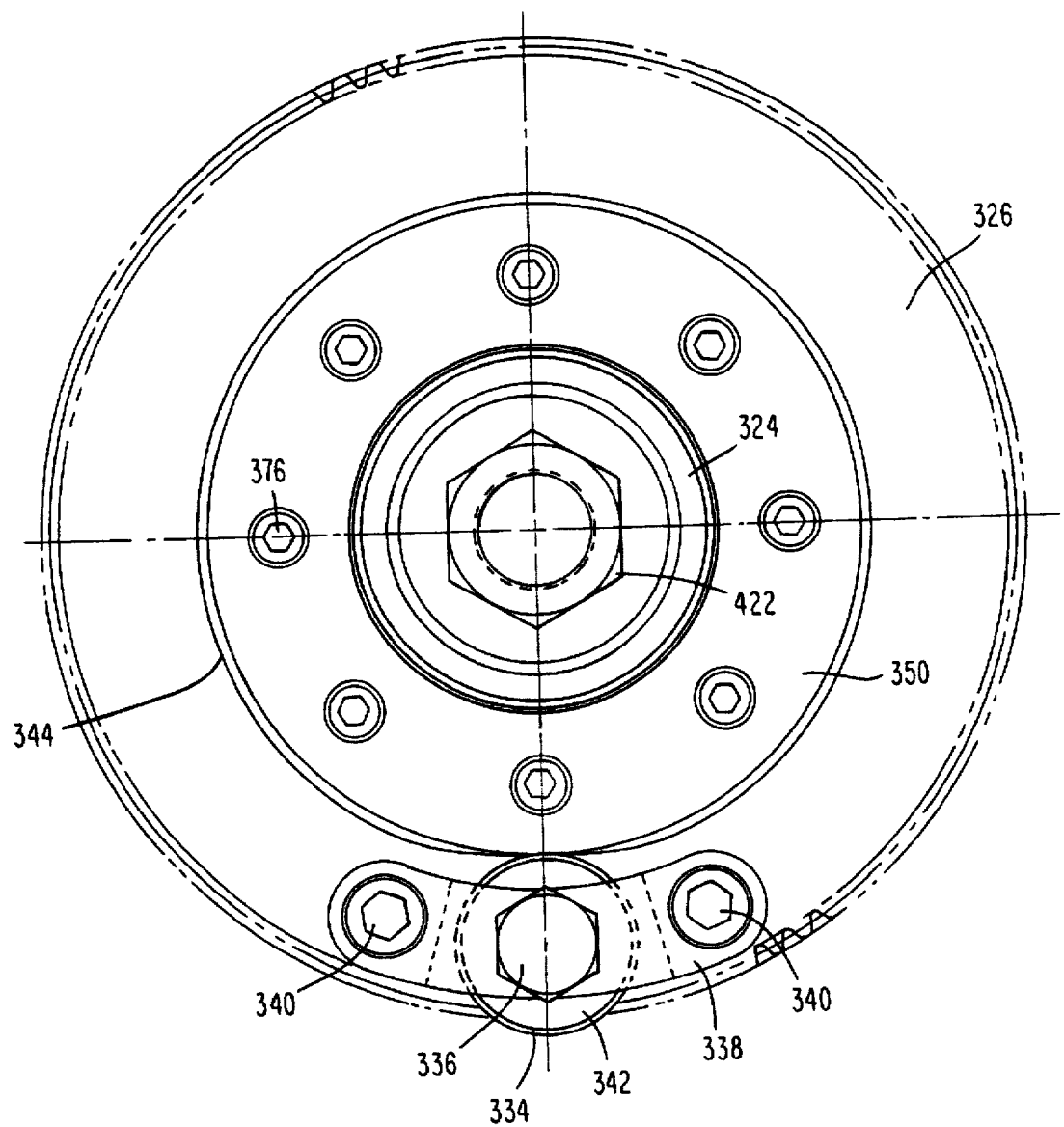
FIG. 9 is an end elevational view viewing the trimmer cartridge assembly of FIG. 8 from the mandrel end.

In accordance with a unique feature of the preferred embodiment, the penetrator hub 332 mounted within each cartridge assembly 300 is pushed radially inward towards the can body by means of a small cam follower roller 334 which is uniquely mounted to project axially from a peripheral portion of one side face 326a of cartridge drive gear 326 into co-planar alignment with the penetrator hub. With reference to FIGS. 8 and 9, the cam follower roller 334 is rotatably mounted on a cam follower bolt 336 which is threadedly received in a peripheral portion of gear 326 and is fixedly supported at a spaced axial distance from the gear with a cam follower bracket 338 subtending an arcuate interval of approximately 30° (see FIG. 9) and bolted at opposite ends thereof with a pair of cap screws 340 also threadedly received in the drive gear face 326a. A pair of cam washers 342 are respectively disposed against opposite faces of the cam follower roller 334 to precisely axially locate the roller on the cam follower bolt 336 in coaxial alignment with the outside generally cylindrical profiled cam surface 344 of the penetrator hub 332. The cam follower roller is rotatable about a rotational axis 346 which is parallel to axis R'.

As the cartridge drive gear 326 is rotated about axis R' as a result of meshing with the large diameter stationary ring gear 30, the cam follower roller 334 is caused to revolve around the penetrator hub 332 as a result of co-rotation of the cam follower roller with the cartridge drive gear 326. The outer surface 344 of the penetrator hub 332 is advantageously formed with a cam surface (best depicted in FIG. 9) which causes a portion of the inside penetrator 348 located diametrically opposite the point of contact of the cam follower with cam 344 to be radially displaced outwardly towards the can body so that its inside penetrator trimming edge 337 contacts with the can body side wall (see, e.g., FIG. 5). Thereby, the entire circumferential extent of this trimming edge 337 is gradually displaced by the penetrator hub 332 to radially urge the can body side wall into cutting engagement with an outside cutting knife 350 mounted within the cartridge assembly 300 and whose inside diameter cutting edge 352 is slightly larger than the outside diameter of the can body 14.

The cam profile 344 now advantageously provided on the penetrator hub 332 allows the inside penetrator trimming edge 337 to cooperate with the inside diameter cutting edge 352 to achieve the same cutting action which occurs with the inside penetrator trimming edge 37 and outside cutting knife edge 40 in the FIG. 1 embodiment. However, instead of advancing the inside penetrator cutting edge into contact with the can body side wall by both displacing and maintaining the inside penetrator trimming edge radially inward of the can body side wall relative to turret axis R, as in the case of inside penetrator trimming edge 37 in the FIG. 1 embodiment, the periphery of the inside penetrator trimming edge 337 is instead progressively advanced by the cam follower roller 334 co-acting with the cam profile 344 of the penetrator hub 332 in the manner described above, to gradually trim the can open end as the can remains non-rotatable with respect to cartridge axis R'.

Stated differently, the only structures in the preferred embodiment which are rotatable about cartridge axis R' are the cartridge drive gear 326 and cam follower roller 334 co-rotatable therewith. Since the other components of each cartridge assembly 300 described in detail below do not rotate about cartridge axis R' as a result of incorporating the cam profile 344 into the penetrator hub 332, the requirement of a large diameter stationary cam ring 34 as in the FIG. 1 embodiment, as well as bearings 52 and seals such as 58, are advantageously eliminated since it is no longer necessary to allow for rotation of the penetrator hub relative to the cartridge support spindle 54 as in the FIG. 1 embodiment. This reduces the weight of the cartridge assemblies 300 of the preferred embodiment by approximately 50% in relation to the FIG. 1 embodiment and also eliminates the use of expensive heavy bearings and the requirement of frequent seal replacement and/or maintenance.

Each cartridge assembly 300 is now comprised of a cartridge support spindle 355 having a rearwardly projecting end 357 which is received within a cartridge retainer 359 used to bolt the cartridge 300 to the periphery of the turret disk in a manner described hereinabove in connection with cartridge 10. The front end portion 361 of the cartridge spindle 355 projecting forwardly from the rearwardly projecting end, i.e., away from the turret disk, is of smaller diameter and is separated from the rearwardly projecting end with a larger diameter flange 363. The cartridge drive gear 326 is mounted on the flange 363 and maintained in proper axial position with a gear guide plate 365 disposed between the rear face of the flange and the front face of the cartridge retainer 359, and a circular ball detent plate 367 engaging the front face of both the flange and the cartridge drive gear. As mentioned hereinabove, the cartridge drive gear 326 is formed with gear teeth which mesh with the internal gear teeth 28 of the stationary ring gear 30 coaxially surrounding the turret disk 16.

The penetrator hub 332 of the preferred embodiment, as best depicted in FIGS. 10 and 11, is mounted on the forwardly projecting end 361 of the cartridge spindle 355 axially forwardly adjacent the ball detent plate 367. The penetrator hub 332 includes a first series of through holes 370 which are circumferentially spaced from each other and are adapted to respectively receive cylindrical spacers 372 having an outer diameter which is less than the inner diameter of the through hole to define an annular clearance 374 therebetween as best depicted in FIG. 8. The screws 376 which are used to secure the penetrator hub 332 to the ball detent plate 367 in axially fixed location extend through these spacers 372 to mount the hub. The penetrator hub 332 also has a flat rear axial face which is adapted to be in radial sliding contact with the flat front face of the ball detent plate 367 when the aforesaid camming movement occurs.

A trim ring locator spacer 380 is mounted with the screws 376 to engage the front axial face of the penetrator hub 332. The outside cutting knife 350 is in turn mounted axially forwardly adjacent the trim ring locator spacer which serves to precisely locate the outside cutting edge 352 in the same shearing plane (see, e.g., FIG. 5) with the inside trimming edge 337. The screw head of each screw 376 is captured within a countersunk bore formed in the front face of the knife 350.

A second series of axial through bores 382 are formed in the penetrator hub 332 at circumferentially spaced intervals from each other in alternating relation with the first through bores 370. These second through bores 382 are concentrically arrayed about the cartridge axis R' and may be of smaller diameter than the first through bores. A spherical ball 384 in each bore 382 is spring-biased to protrude rearwardly from the rear face of the penetrator hub 332 into normal seating contact with a smaller diameter seating bore 386 in the ball detent plate 367 in coaxial alignment therewith. The spring mechanism is substantially identical to the spring mechanism in the FIG. 1 embodiment and therefore comprises a pair of spring pads 387 with a compressed spring 388 therebetween located in a front portion of the second through bore 382 which urges the ball 384 into the aforesaid seating contact. When properly seated in these seating bores, the penetrator hub 332 is precisely concentrically mounted on the forwardly projecting portion 361 of the cartridge spindle 355 which in turn centers the inside penetrator 337 described hereinbelow. Radial displacement of the penetrator hub 332 by the cam follower 334 causes the balls 384 to completely retract within the second through bores 382 as they are offset out of coaxial alignment with the seating bores 386 when the rear face of the penetrator hub slides in the radial direction A against the stationary front face of the ball detent plate 367. When the cam surface 344 returns to a neutral position in coaxial alignment with the cartridge axis R' (this occurs when the cam follower roller 334 engages the flat or dwell portion 344' of the cam profile 344 as best depicted in FIG. 11), the spring-biased balls 384 quickly and positively re-center the penetrator hub 332 on the forwardly projecting portion 361 of the cartridge spindle 355 as a result of spring-biased re-seating of the balls within the seating bores.

In the preferred embodiment, the penetrator hub 332 is further formed with a series of third axial through bores 390 formed in a concentric array relative to the first and second through bores 370,382 at radially inwardly spaced locations therefrom. Each through bore 390 has a forward larger diameter portion 392 opening to the front face of the penetrator hub 332, and a rear smaller diameter portion 394 communicating with the rear face of the penetrator hub. As best depicted in FIG. 8, these rearwardly projecting portions 394 are adapted to be supplied with pressurized air through a series of passageways 396 and 398 formed in the ball detent plate 372 and the rearwardly projecting end 357 of the cartridge spindle 355 when the cam follower roller 334 reaches the trim ring stripping position at the low or dwell region 344' of the cam profile 344 depicted in FIG. 11. A series of ejection pins 400, respectively disposed in the larger diameter portions 392 of each third through bore 390, are propelled forwardly by the pressurized air acting upon rear end faces thereof to eject the trim ring 12 through the annular exit opening 402 defined between the outside cutting knife 350 and the inside penetrator 337.

The ejector pins 400 perform substantially the same function as the trim ejector ring 150 in the FIG. 1 embodiment of this invention. However, since the stripper ring 150 in the FIG. 1 embodiment has a relatively short axial bearing surface (i.e., sliding along the outer cylindrical surface of the inside penetrator) in relation to its overall diameter, there is a tendency for the ejector ring 150 to tilt and jam within the ejection chamber 130 during forcible ejection of the trim ring 12. This problem becomes particularly pronounced when the trimmer cartridge assembly 10 of FIG. 1 is used in a vertically oriented position, particularly because the trim ring is generally of unequal length within the environment of a drawn and ironed can and, consequently, generally only has a single contact point with the ejector ring against which it is disposed.

The feature of multiple ejection pins 400 advantageously avoids the potential problems inherent in an ejector ring 150 of the type depicted in FIG. 1, since each pin functions as an independent piston which forcibly drives forward that portion of the trim ring 12 it is in contact with. Therefore, even if several of the pins 400 were to jam, there are a sufficient number of pins available to apply a forcible ejection force against the trim ring to eject it from the ejection chamber. Furthermore, the likelihood of any one pin jamming within its associated larger diameter 392 portion of the third through bores 390 is small since the length of each pin is designed to be about at least twice as long as its diameter. Thus, this relationship assures that the axial sliding bearing surface of each pin 400 is smoothly guided within its associated third through bore without jamming.

The forwardmost extent of travel of each pin 400 is defined by the inside penetrator 337 as is best depicted in FIG. 8. To ensure that the trim ring 12 is completely blown off of the cartridge spindle 355 to enable a next-in-line can to be fed onto the mandrel 320, the third through bores 390 are connected to each other through a continuously annular slot 410 extending to a depth within the larger diameter portion 392 of each through bore 390 by a distance slightly greater than the length of each ejector pin 400. In this manner, as the ejector pins 400 are forcibly propelled to their forwardmost extent against the inside penetrator 337, the rear portions of the continuous slot 410 are now exposed to the flow of pressurized air. This allows some of the pressurized air to flow around and between the pins 400 to completely blow the trim ring 12 from the spindle 355.

In the preferred embodiment, the penetrator hub 332 is formed with a shoulder 412 in its front face which is located radially inwardly from and co-planar with the trim ring locator spacer 380. The inside penetrator 337 in the preferred embodiment is advantageously formed as a thin disk-shaped element having an inside penetrator trimming edge 337 which is substantially identical to the inside penetrator trimming edge 37 in the first embodiment so that the resultant shearing of the can open end between the knife and inside penetrator edges 337,340 occurs with the same type of shearing action as in the FIG. 1 embodiment.

The inside penetrator 337 is a wear item that requires frequent replacement. Therefore, the feature of forming the inside penetrator as a thin ring-shaped disk disposed in a locating shoulder 412 of the penetrator hub 332, as opposed to inside penetrator 36 in the FIG. 1 embodiment, advantageously minimizes the cost associated with frequent inside penetrator replacement during normal operation.

The penetrator hub 332 is further formed with a central through opening 415 receiving the forwardly projecting portion 361 of the cartridge spindle 355 and a cylindrical spacer collar 417 coaxially mounted on the spindle within the central opening. The outer cylindrical surface of the spacer 417 is spaced radially inward from the inner cylindrical surface of the central opening 415 to enable radial displacement of the penetrator hub 332 to occur during controlled camming movement as discussed in detail above.

The forwardly projecting portion 361 of the cartridge spindle 355, extending from the penetrator hub 332, supports a penetrator retainer 114, a trim height spacer 120 and the mandrel 320, in that order, having outer cylindrical surfaces 118, 126 and 128 identical to the corresponding surfaces and structures in the FIG. 1 embodiment, to provide proper seating of the can body on the cartridge assembly 300. However, in accordance with a further improvement feature of the preferred embodiment, a nose cone 324, identical to that used in conventional can bottom former tooling, is now bolted to the front end of the mandrel 320 to define a can bottom seating surface. This nose cone insert 324 has a bottom opening formed with a through bore receiving a forward threaded end 420 of the cartridge spindle and a large diameter nut 422 for fastening the nose cone to the spindle. The nut 422 is received within a cylindrical recess in the nose cone insert. The upper or forward open end of this insert is profiled to correspond to the can bottom it is adapted to provide positive seating contact thereagainst.

The feature of utilizing a nose cone insert 324 advantageously allows the cartridge assembly 300 of the preferred embodiment to be used for a variety of different cans having different bottom configurations, simply by unbolting one nose cone to replace it with a different type of nose cone to run a series of cans having a different bottom configuration. Since the nose cone insert is bolted directly to the cartridge spindle 355, it is possible to eliminate chamber 138 and vacuum passageways 140 which appear in the FIG. 1 embodiment and replace same by extending central vacuum passageway 136 through the spindle to open communication with the bottom profile of the nose cone insert. This minimizes the volume of air which must be sucked from the vacuum passageway system before vacuum can be applied directly to the can bottom. Therefore, the configuration of the preferred embodiment enables vacuum to be applied in a more rapid manner to positively seat the can body on the mandrel 320 with vacuum in comparison to the FIG. 1 embodiment.

As mentioned above, the cam profile 344 which is now formed on the outer cylindrical surface of the penetrator hub 332 in the preferred embodiment is best depicted in FIG. 11. Therein, the penetrator hub is non-rotatable about spindle axis R' while the cam follower roller 334 is rotatable about axis R' as a result of rotation of cartridge drive gear 326 in the manner described above. Since the distance between cartridge axis R' and the rotational axis 346 of the cam follower roller 334 is always constant, the cam follower is operable to radially displace the inside penetrator 337 radially outwardly towards the can body as the cam follower orbits around the stationary penetrator hub and contacts those portions of the cam profile which are spaced a distance from axis R' greater than the distance between the centers R', 346 of the cartridge spindle and cam follower roller.

With reference to FIG. 11, as the cam follower roller 334 rotates clockwise between points A2 and A1, the penetrator hub 332 and therefore the inside penetrator trimming edge 337 is centered with respect to the outside cutting knife 350. In this interval, a trimmed can is ejected from the cartridge mandrel 355 by means of pressurized air supplied through the vacuum passageway 136 as the inside penetrator 337 re-centers itself as the cam follower 334 rotates clockwise to point A2. As the cam follower 334 rotates from point A2 towards point A1, pressurized air is now supplied to eject the trim ring from the ejection chamber with the stripping pins 400. Another can to be trimmed is then supplied onto the mandrel 320 and seated against the nose cone with vacuum which is now supplied through the vacuum passageways 136. As the cam follower 334 is rotated clockwise to point A1, it once again radially displaces the penetrator hub 332 so that the inside penetrator trimming edge 337 progressively moves into contact with the can body side wall to create shearing action with the outside cutting knife edge 350 until the entire circumferential periphery of the can has been trimmed, at which point the cam follower roller 334 approaches point A2 as described hereinabove.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. Apparatus for trimming a can body along a cylindrical open end thereof, comprising:

(a) a cartridge assembly having a longitudinal axis, said cartridge assembly including an annular outer shearing element having an inner diameter greater than the outer diameter of the can body open end; an inner element having an outer diameter less than the inner diameter of the can body open end; wherein said inner and outer elements are coaxially mounted relative to the longitudinal axis of the cartridge assembly and are sufficiently spaced from each other to receive the open end therebetween; and wherein said cartridge assembly includes a spindle non-rotatably mounted to a turret disk for co-rotation therewith about a turret axis of rotation which is parallel to the longitudinal axis of the cartridge assembly, and said assembly includes a cam having a cam profile surface and a cam follower having a cam follower surface;

(b) a drive gear operatively connected to the cartridge assembly for rotation relative to the cartridge assembly longitudinal axis, said drive gear meshing with a stationary ring gear mounted adjacent the turret disk to rotate the drive gear during orbital rotation of the cartridge assembly about the turret axis; and wherein said cartridge assembly further includes one of said cam profile surface and said cam follower surface being co-rotatably connected to the drive gear and the other of said cam profile surface and said cam follower surface being mounted to transmit cam controlled movement to the inner element.

2. The apparatus of claim 1, wherein said cartridge assembly spindle supports said inner and outer elements, and said cartridge assembly further including a penetrator hub mounted on the cartridge spindle in coaxial relationship with the inner element which is in the form of an inside penetrator having a trimming edge, said penetrator hub including said cam profile surface, and wherein said cam follower is a roller mounted to project axially from the drive gear for orbital rotation around the penetrator hub about the cartridge longitudinal axis, wherein radial displacement of the penetrator hub by the cam follower roller causes corresponding radial displacement of the trimming edge so that the trimming edge intersects the can body and overlaps with a cutting edge of the outer shearing element to generate cutting forces which trim the can body as said trimming edge is progressively advanced by camming action to gradually contact the entire circumferential periphery of the can body during rotation of the drive gear and thereby orbital movement of the cam follower roller.

3. The apparatus of claim 2, wherein said penetrator hub is non-rotatably mounted on the cartridge spindle with said cartridge drive gear and cam follower roller being rotatably mounted on the spindle.

4. The apparatus of claim 3, wherein said penetrator hub includes a central opening through which the cartridge spindle extends in radially spaced relation thereto; a spring-loaded centering arrangement protruding from an axial face of the penetrator hub to center said penetrator hub relative to the spindle; and wherein said penetrator hub is further formed with a series of through bores which intersect each other to define an annular chamber adapted to receive the open end of the untrimmed can body projecting axially rearwardly from an axial shearing plane of the inner and outer elements into said penetrator, and a plurality of ejector pins respectively slidably disposed within said through bores, each said through bore communicating with a source of pressurized air, wherein said pins are forcibly propelled under the action of pressurized air to contact and eject a trim ring from the chamber.

5. The apparatus of claim 4, wherein said inside penetrator is a thin disk-shaped ring mounted in an annular shoulder formed in a front face of the penetrator hub, said trimming edge formed on said inside penetrator being a wearable item which is replaced by replacement of said thin disk-shaped ring.

6. The apparatus of claim 1, wherein said cartridge assembly includes a cartridge spindle supporting said inner and outer elements, and said cartridge assembly further comprising a mandrel mounted to the forwardly extending end of the spindle to receive the can body and properly locate the untrimmed open end between the inner and outer elements, and said cartridge assembly further comprising a nose cone which is attachably mounted to the front end of the mandrel to provide a bottom profile corresponding to the bottom profile of the can body to ensure proper seating therewith.

7. The apparatus of claim 1, wherein said inner element has a radiussed trimming edge and said outer element has a knife cutting edge.

8. Apparatus for trimming a can body along a cylindrical open end thereof, comprising:

(a) a cartridge assembly having a longitudinal axis, said cartridge assembly including an annular outer shearing element having an inner diameter greater than the outer diameter of the can body open end; an inner element having an outer diameter less than the inner diameter of the can body open end; wherein said inner and outer elements are coaxially mounted relative to the longitudinal axis of the cartridge assembly and are sufficiently spaced from each other to receive the open end therebetween; and wherein said cartridge assembly includes a spindle non-rotatably mounted to a turret disk for co-rotation therewith about a turret axis of rotation which is parallel to the longitudinal axis of the cartridge assembly, and said assembly includes a cam having a cam profile surface and a cam follower having a cam follower surface;

(b) a drive gear operatively connected to the cartridge assembly for rotation relative to the cartridge assembly longitudinal axis, said drive gear meshing with a stationary ring gear mounted adjacent the turret disk to rotate the drive gear during orbital rotation of the cartridge assembly about the turret axis; and wherein said cartridge assembly further includes one of said cam profile surface and said cam follower surface being co-rotatably connected to the drive gear and the other of said cam profile surface and said cam follower surface being mounted to transmit cam controlled movement to the inner element, wherein said can body and said inner and outer elements are non-rotatable with respect to a longitudinal axis of the can body during said radial displacement and said inner and outer elements gradually contact the entire periphery of the open end portion to trim it from the can body by gradual cammed radial displacement of said inner element.

9. The apparatus of claim 8, wherein said inner element has a radiussed trimming edge and said outer element has a knife cutting edge.

10. Apparatus for trimming a can body along a cylindrical open end thereof, comprising:

(a) an annular outer shearing element having an inner diameter greater than the outer diameter of the can body open end;

(b) an inner element having an outer diameter less than the inner diameter of the can body open end;

(c) a support mechanism to which said inner and outer elements are coaxially mounted in radially spaced relationship to each other to receive the open end therebetween;

(d) a displacement arrangement means for radially displacing said inner and outer elements in relation to each other and into a portion of the can body defining said open end to thereby shear the can body; and (e) a plurality of individual forcible ejection members circumferentially spaced from each other and extending between the inner and outer elements, wherein said forcible ejection members are forcibly propelled under the action of a pressurized fluid to contact and eject a trim ring from between said inner and outer elements after said trim ring is sheared from the open end of the can body, wherein said forcible ejection members are respectively slidably disposed and self-contained within a series of circumferentially spaced passages formed between said inner and outer elements.

11. The apparatus of claim 10, wherein said inner element has a radiussed trimming edge and said outer element has a knife cutting edge.

12. The apparatus of claim 10, wherein said forcible ejection members are ejector pins and said passages are throughbores.

13. Apparatus for trimming a can body along a cylindrical open end thereof, comprising:

(a) a cartridge assembly having a longitudinal axis, said cartridge assembly including an annular outer shearing element having an inner diameter greater than the outer diameter of the can body open end; an inner element having an outer diameter less than the inner diameter of the can body open end; wherein said inner and outer elements are coaxially mounted relative to the longitudinal axis of the cartridge assembly and are sufficiently spaced from each other to receive the open end therebetween; and wherein said cartridge assembly includes a spindle non-rotatably mounted to a turret disk for co-rotation therewith about a turret axis of rotation which is parallel to the longitudinal axis of the cartridge assembly, and said assembly includes a cam having a cam profile surface and a cam follower having a cam follower surface;

(b) a drive gear operatively connected to the cartridge assembly for rotation relative to the cartridge assembly longitudinal axis, said drive gear meshing with a stationary ring gear mounted adjacent the turret disk to rotate the drive gear during orbital rotation of the cartridge assembly about the turret axis; and wherein said cartridge assembly further includes one of said cam profile surface and said cam follower surface being co-rotatably connected to the drive gear and the other of said cam profile surface and said cam follower surface being mounted to transmit cam controlled movement to the inner element; and (c) a plurality of forcible ejection members circumferentially spaced from each other and extending between the inner and outer elements, wherein said ejection members are forcibly propelled under the action of a pressurized fluid to contact and eject a trim ring from between said inner and outer elements after said trim ring is sheared from the open end of the can body, wherein said ejection members are respectively slidably disposed and self-contained within a series of circumferentially spaced passages formed between said inner and outer elements.

14. The apparatus of claim 13, wherein said forcible ejection members are ejector pins and said passages are throughbores.

15. Apparatus for trimming a can body along a cylindrical open end thereof, comprising:

(a) an annular outer shearing element having an inner diameter greater than the outer diameter of the can body open end;

(b) an inner element having an outer diameter less than the inner diameter of the can body open end;

(c) a support mechanism to which said inner and outer elements are coaxially mounted in radially spaced relationship to each other to receive the open end therebetween;

(d) a displacement mechanism operatively connected to the support mechanism to radially displace said inner and outer elements in relation to each other and into a portion of the can body defining said open end to thereby shear the can body; and (e) a plurality of forcible ejection members circumferentially spaced from each other and extending between the inner and outer elements, wherein said ejection members are forcibly propelled under the action of a pressurized fluid to contact and eject a trim ring from between said inner and outer elements after said trim ring is sheared from the open end of the can body, wherein said ejection members are respectively slidably disposed and self-contained within a series of circumferentially spaced passages formed between said inner and outer elements.

16. The apparatus of claim 15, wherein said forcible ejection members are ejector pins and said passages are throughbores.

17. Apparatus for trimming a can body along a cylindrical open end thereof, comprising:

(a) a shaft;

(b) an annular outer shearing element including a sharp cutting edge having an inner diameter greater than the outer diameter of the can body open end;

(c) a cylindrical inner element operatively connected to the shaft and formed with a radiussed trimming edge having an outer diameter less than the inner diameter of the can body open end; wherein said inner element and said outer shearing element are coaxially mounted around the shaft and are sufficiently spaced from each other to receive the open end therebetween;

(d) a cam mounted to the shaft to radially displace said inner element and outer shearing element in relation to each other and into a portion of the can body defining said open end to thereby shear the can body and ensure that a burr produced by the shearing action is on the trim ring formed during trimming and not on the can body; and (e) a plurality of forcible ejection members circumferentially spaced from each other and extending between the inner and outer elements, wherein said ejection members are forcibly propelled under the action of a pressurized fluid to contact and eject a trim ring from between said inner and outer elements after said trim ring is sheared from the open end of the can body, wherein said ejection members are respectively slidably disposed and self-contained within a series of circumferentially spaced passages formed between said inner and outer elements.

\* \* \* \* \*